United States Patent
Sato et al.

(10) Patent No.: US 10,711,145 B2
(45) Date of Patent: Jul. 14, 2020

(54) PHOTOCURABLE INK COMPOSITION AND METHOD FOR FORMING IMAGE

(71) Applicant: FUJIFILM CORPORATION, Minato-ku, Tokyo (JP)

(72) Inventors: Noriaki Sato, Kanagawa (JP); Yasuhiro Sawamura, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/546,312

(22) Filed: Aug. 21, 2019

(65) Prior Publication Data

US 2019/0375953 A1 Dec. 12, 2019

Related U.S. Application Data

(63) Continuation of application No. PCT/JP2018/005105, filed on Feb. 14, 2018.

(30) Foreign Application Priority Data

Mar. 30, 2017 (JP) .................................. 2017-068888

(51) Int. Cl.
| | |
|---|---|
| *B41J 11/00* | (2006.01) |
| *C09D 11/101* | (2014.01) |
| *B41M 5/00* | (2006.01) |
| *C09D 11/107* | (2014.01) |
| *C09D 11/38* | (2014.01) |

(52) U.S. Cl.
CPC ............ *C09D 11/101* (2013.01); *B41J 11/002* (2013.01); *B41M 5/0023* (2013.01); *C09D 11/107* (2013.01); *C09D 11/38* (2013.01)

(58) Field of Classification Search
CPC ....... B41J 2/2114; B41J 11/00; B41J 11/0015; B41J 11/002; B41J 2/01; B41J 15/04; C09D 11/30; C09D 11/102
See application file for complete search history.

(56) References Cited

U.S. PATENT DOCUMENTS

| | | | |
|---|---|---|---|
| 2009/0197056 A1 | 8/2009 | Yokoi et al. | |
| 2011/0183081 A1 | 7/2011 | Nakane et al. | |
| 2011/0241264 A1 | 10/2011 | Yokoi | |
| 2012/0056930 A1* | 3/2012 | Fukagawa | B41J 2/2107 347/20 |
| 2012/0286145 A1* | 11/2012 | Kuge | C09B 29/0085 250/226 |
| 2013/0295342 A1* | 11/2013 | Araki | B32B 3/10 428/195.1 |
| 2014/0022299 A1* | 1/2014 | Yokoi | C09D 11/30 347/20 |
| 2015/0252202 A1 | 9/2015 | Nerad | |
| 2016/0075807 A1 | 3/2016 | Idei et al. | |

FOREIGN PATENT DOCUMENTS

| | | |
|---|---|---|
| EP | 2371912 A1 | 10/2011 |
| JP | 2009-209352 A | 9/2009 |
| JP | 2011-148918 A | 8/2011 |
| JP | 2011-225848 A | 11/2011 |
| JP | 2015-533897 A | 11/2015 |
| WO | 2017/033984 A1 | 3/2017 |

OTHER PUBLICATIONS

International Search Report issued in International Application No. PCT/JP2018/005105 dated Apr. 3, 2018.
Written Opinion of the ISA issued in International Application No. PCT/JP2018/005105 dated Apr. 3, 2018.
Extended European Search Report dated Feb. 25, 2020, issued in corresponding EP Patent Application No. 18777006.0.

* cited by examiner

*Primary Examiner* — Kristal Feggins
(74) *Attorney, Agent, or Firm* — SOLARIS Intellectual Property Group, PLLC

(57) ABSTRACT

A photocurable ink composition is provided, the composition including: a resin that includes at least one of a structural unit (1) below or a structural unit (2) below; and at least one of a monofunctional radical-polymerizable monomer or a bifunctional radical-polymerizable monomer, in which a total content of the monofunctional radical-polymerizable monomer and the bifunctional radical-polymerizable monomer is 50% by mass or more relative to a total amount of the photocurable ink composition.

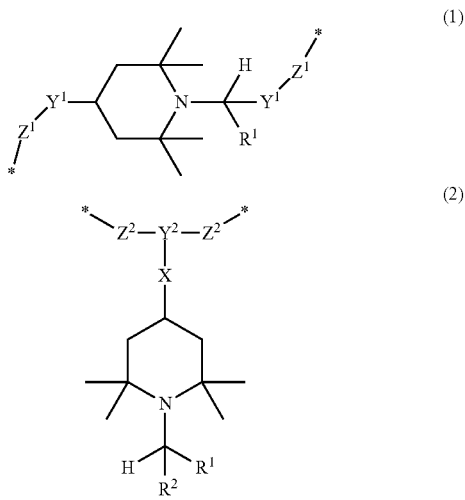

14 Claims, No Drawings

PHOTOCURABLE INK COMPOSITION AND METHOD FOR FORMING IMAGE

CROSS-REFERENCE TO RELATED APPLICATIONS

This application is a continuation application of International Application No. PCT/JP2018/005105, filed Feb. 14, 2018, the disclosure of which is incorporated herein by reference in its entirety. Further, this application claims priority from Japanese Patent Application No. 2017-068888, filed Mar. 30, 2017, the disclosure of which is incorporated herein by reference in its entirety.

BACKGROUND OF THE INVENTION

1. Field of the Invention

The present disclosure relates to a photocurable ink composition and a method for forming an image.

2. Description of the Related Art

Hitherto, photocurable ink compositions having properties (that is, photocurability) of being cured by active energy rays (hereinafter also referred to as "light") such as ultraviolet rays are known.

An example of a known radiation-curable ink composition having durability to applications to outdoor printing and useful for such applications is a radiation-curable ink composition that includes a colorant and a 2,2,6,6-tetramethylpiperidinyl compound. The 2,2,6,6-tetramethylpiperidinyl compound is present in the radiation-curable ink composition in a concentration of more than 0.5% by weight. A hindered amine group of the 2,2,6,6-tetramethylpiperidinyl compound is substituted with only carbon or hydrogen. The 2,2,6,6-tetramethylpiperidinyl compound is solid at 20° C. and does not include a carbon-carbon double bond (refer to, for example, JP2015-533897A).

An example of a known ink composition that has good ejection stability even after long-term storage and high sensitivity and that is cured to provide an image having good flexibility, good adhesion to a recording medium, and a high surface hardness is an active radiation-curable ink composition including (A) a polymer having two or more acidic groups or two or more basic groups, (B) a polymerizable monomer having a substituent capable of forming a counter salt with the acidic groups or the basic groups of the (A) polymer, (C) a photopolymerization initiator, and (D) a polymerizable monomer having a structure different from a structure of the (B) polymerizable monomer (refer to, for example, JP2011-225848A).

An example of a known photocurable ink composition which provides a recorded image having good light resistance and curability and in which bleeding of an ultraviolet absorber or a light stabilizer is suppressed on a surface of an image when the image is stored for a long time is a photocurable ink composition that contains (A) a polymerizable compound, (B) an acylphosphine oxide-based photopolymerization initiator, and (C) at least one compound selected from the group consisting of a specific hydroxyphenyl triazine-based compound and a hindered amine-based compound having a mass-average molecular weight of 2,000 or more and 4,000 or less. A content of the component (C) is 0.2% by mass or more and 2.0% by mass or less (refer to, for example, JP2011-148918A).

SUMMARY OF THE INVENTION

In some cases, however, it is desired for the photocurable ink compositions described in JP2015-533897A, JP2011-225848A, and JP2011-148918A to further improve the hardness, adhesion to a substrate, and scratch resistance of an image to be formed.

Herein the "scratch resistance" is distinguished from the "pencil hardness", which is an indicator for evaluating the hardness itself (more specifically, an indicator for evaluating the degree of hardness of a pencil with which a scratch is not formed when scratching is performed), in that the scratch resistance is an indicator for evaluating wear resistance against repeated scratching.

An object of the present disclosure is to provide a photocurable ink composition and an image forming method capable of forming an image having good hardness, adhesion to a substrate, and scratch resistance.

Specific means for achieving the above object include the following embodiments.

<1> A photocurable ink composition containing a resin that includes at least one of a structural unit (1) below or a structural unit (2) below; and at least one of a monofunctional radical-polymerizable monomer or a bifunctional radical-polymerizable monomer, in which a total content of the monofunctional radical-polymerizable monomer and the bifunctional radical-polymerizable monomer is 50% by mass or more relative to a total amount of the photocurable ink composition.

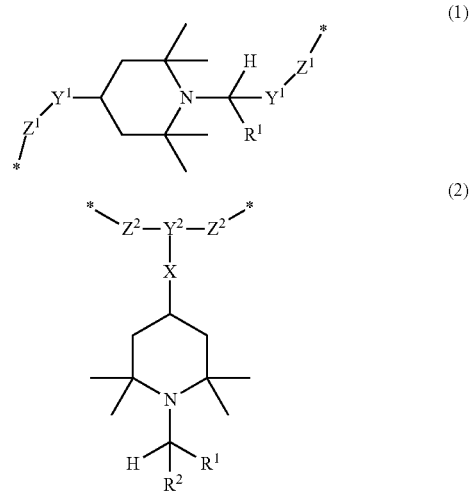

In the structural unit (1), $R^1$ represents a hydrogen atom or an alkyl group having 1 to 3 carbon atoms; two $Y^1$ each independently represent a single bond or a divalent organic group having 1 to 20 carbon atoms; two $Z^1$ each independently represent a single bond, a carbonate bond, an amide bond, or a urethane bond; two * each represent a binding site; and provided that, in a case where one of two $Z^1$ is a single bond, the other is not a single bond.

In the structural unit (2), $R^1$ represents a hydrogen atom or an alkyl group having 1 to 3 carbon atoms; $R^2$ represents a hydrogen atom or a hydrocarbon group having 1 to 12 carbon atoms; X represents an ether bond or an ester bond; $Y^2$ represents a trivalent organic group having 1 to 20 carbon atoms; two $Z^2$ each independently represent a single bond, an ester bond, a carbonate bond, an amide bond, or a urethane bond; two * each represent a binding site; and provided that, in a case where one of two $Z^2$ is a single bond, the other is not a single bond.

<2> The photocurable ink composition according to <1>, in which the resin includes the structural unit (2).

<3> The photocurable ink composition according to <2>, in which two $Z^2$ in the structural unit (2) each independently represent an ester bond or a urethane bond.

<4> The photocurable ink composition according to any one of <1> to <3>, in which the resin further includes a structural unit that has a ring structure.

<5> The photocurable ink composition according to any one of <1> to <4>, in which the resin has an amine value of 1.00 mmol/g or more.

<6> The photocurable ink composition according to any one of <1> to <5>, in which the resin has a weight-average molecular weight of from 5,000 to 30,000.

<7> The photocurable ink composition according to any one of <1> to <6>, in which a ratio of a total amount of the structural unit (1) and the structural unit (2) with respect to a total amount of all the structural units of the resin is 10% by mole or more.

<8> The photocurable ink composition according to any one of <1> to <7>, in which the resin includes a branched structure X, the branched structure X is an alkylene group having 2 or more carbon atoms and substituted with a substituent, and the substituent is at least one selected from the group consisting of a linear alkyl group having 2 or more carbon atoms, a branched alkyl group having 3 or more carbon atoms, a linear alkoxy group having 2 or more carbon atoms, a branched alkoxy group having 3 or more carbon atoms, a linear alkoxyalkyl group having 2 or more carbon atoms, and a branched alkoxyalkyl group having 3 or more carbon atoms.

<9> The photocurable ink composition according to <8>, in which the resin further includes a structural unit that has the branched structure X, as a structural unit other than the structural unit (1) and the structural unit (2).

<10> The photocurable ink composition according to any one of <1> to <9>, in which the resin includes an ethylenically unsaturated bond.

<11> The photocurable ink composition according to <10>, in which the resin further includes a structural unit that has the ethylenically unsaturated bond, as a structural unit other than the structural unit (1) and the structural unit (2).

<12> The photocurable ink composition according to any one of <1> to <11>, in which a content of the resin is from 1.0% by mass to 8.0% by mass relative to the total amount of the photocurable ink composition.

<13> The photocurable ink composition according to any one of <1> to <12>, further containing a photopolymerization initiator.

<14> A method for forming an image, the method including: applying the photocurable ink composition according to any one of <1> to <13> to a substrate; and irradiating the photocurable ink composition applied to the substrate with active energy rays.

According to the present disclosure, there are provided a photocurable ink composition and an image forming method capable of forming an image having good hardness, adhesion to a substrate, and scratch resistance.

DESCRIPTION OF THE PREFERRED EMBODIMENTS

In the present specification, a range of numerical values expressed by using "to" means a range including a numerical value described before "to" as a minimum and a numerical value described after "to" as a maximum.

In the present specification, when a plurality of substances corresponding to each component are present in a composition, an amount of each component in the composition means a total amount of the plurality of substances that are present in the composition unless otherwise stated.

In the present specification, when a plurality of structural units corresponding to each structural unit are present in a resin, an amount of each structural unit in the resin means a total amount of the plurality of structural units that are present in the resin unless otherwise stated.

In the present specification, the term "step" refers to not only an independent step but also a step that is not clearly distinguished from another step as long as a desired purpose of the step is achieved.

In the present specification, the term "light" covers a concept that includes active energy rays such as γ-rays, β-rays, electron beams, ultraviolet rays, visible rays, and infrared rays.

In the present specification, ultraviolet rays may be referred to as "UV (ultraviolet) light".

In the present specification, light emitted from an LED (light emitting diode) light source may be referred to as "LED light".

In the present specification, the term "(meth)acrylic acid" covers a concept that includes both acrylic acid and methacrylic acid, the term "(meth)acrylate" covers a concept that includes both acrylate and methacrylate, and the term "(meth)acryloyl group" covers a concept that includes both an acryloyl group and a methacryloyl group.

In the present specification, the symbol "*" in a chemical formula represents a binding site.

In the present specification, a structural unit may be simply referred to as a "unit".

Photocurable Ink Composition

A photocurable ink composition (hereinafter also simply referred to as an "ink") of the present disclosure contains a resin that includes at least one of a structural unit (1) below or a structural unit (2) below (hereinafter also referred to as a "specific resin"), and at least one of a monofunctional radical-polymerizable monomer or a bifunctional radical-polymerizable monomer (hereinafter also referred to as a "specific monomer"). A total content of the monofunctional radical-polymerizable monomer and the bifunctional radical-polymerizable monomer is 50% by mass or more relative to a total amount of the ink.

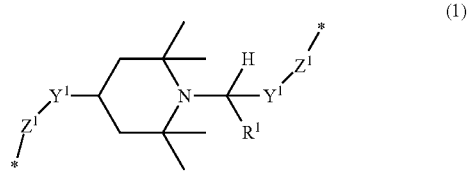

(1)

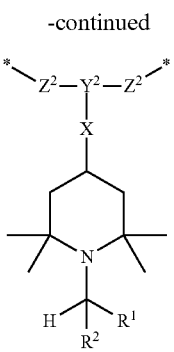

(2)

In the structural unit (1), $R^1$ represents a hydrogen atom or an alkyl group having 1 to 3 carbon atoms; two $Y^1$ each independently represent a single bond or a divalent organic group having 1 to 20 carbon atoms; two $Z^1$ each independently represent a single bond, a carbonate bond, an amide bond, or a urethane bond; and two * each represent a binding site.

Provided that, in a case where one of two $Z^1$ is a single bond, the other is not a single bond.

In the structural unit (2), $R^1$ represents a hydrogen atom or an alkyl group having 1 to 3 carbon atoms; $R^2$ represents a hydrogen atom or a hydrocarbon group having 1 to 12 carbon atoms; X represents an ether bond or an ester bond; $Y^2$ represents a trivalent organic group having 1 to 20 carbon atoms; two $Z^2$ each independently represent a single bond, an ester bond, a carbonate bond, an amide bond, or a urethane bond; and two * each represent a binding site.

Provided that, in a case where one of two $Z^2$ is a single bond, the other is not a single bond.

Hereinafter, the structural unit (1) may be simply referred to as a "unit (1)", and the structural unit (2) may be simply referred to as a "unit (2)".

According to the ink of the present disclosure, an image having good hardness (for example, pencil hardness), adhesion to a substrate, and scratch resistance can be formed.

In the present specification, the adhesion of an image to a substrate is also referred to as an "adhesion of an image" or simply referred to as an "adhesion".

More specifically, the ink of the present disclosure is a photocurable ink composition containing the specific monomer as a main liquid. Accordingly, the ink of the present disclosure has a property (that is, photocurability) of being cured by polymerization of the specific monomer when irradiated with light.

Under this assumption, since the ink of the present disclosure contains the specific resin that includes at least one of the unit (1) or the unit (2), an image having further improved hardness, adhesion, and scratch resistance can be formed.

The reason why this advantage is achieved may be as follows.

Each of the unit (1) and the unit (2) in the specific resin includes a hindered amine structure, further includes a carbon atom (hereinafter also referred to as "α-carbon") at the α-position with respect to the nitrogen atom of the hindered amine structure, and further includes at least one hydrogen atom (hereinafter also referred to as "α-hydrogen") bound to this α-carbon. Herein, the α-hydrogen is the hydrogen atom denoted by symbol "H" in each of the unit (1) and the unit (2).

The unit (1) and the unit (2) each including α-hydrogen are considered to have a function of suppressing a phenomenon (oxygen inhibition) in which radical polymerization of a radical-polymerizable monomer is inhibited by oxygen.

When the ink of the present disclosure is applied to a substrate, and the ink (image) applied to the substrate is irradiated with light, radical polymerization of the specific monomer may proceed efficiently due to the function (function of suppressing oxygen inhibition) of the α-hydrogen.

The unit (1) that can be included in the specific resin includes a hindered amine structure and a carbonate bond, an amide bond, or a urethane bond in the main chain thereof.

In contrast to the specific resin, an existing known hindered amine compound is Comparative Resin a ("Tinuvin (registered trademark) 622" manufactured by BASF; hereinafter also referred to as "T622") that includes a hindered amine structure and an ester bond in the main chain thereof and that is shown in Comparative Examples 1A and 1B described below.

The specific resin of an embodiment including the unit (1) differs from Comparative Resin a in that the specific resin includes a carbonate bond, an amide bond, or a urethane bond in the main chain thereof, whereas Comparative Resin a does not include any of these bonds but includes an ester bond in the main chain thereof.

In the case where an ink that contains the specific resin of the embodiment including the unit (1) is used, the hardness, adhesion, and scratch resistance of an image to be formed are better than those in the case where an ink that contains Comparative Resin a is used (for example, Comparative Examples 1A and 1B described below).

This may be because the intermolecular interaction is improved by the presence of a hydrogen-bonding functional group, such as a carbonate bond, an amide bond, or a urethane bond, in the main chain, and a film hardness improves.

Another existing known hindered amine compound is Comparative Resin c which is a methacrylic copolymer that includes a hindered amine structure in a side chain thereof and that does not include any of a carbonate bond, an amide bond, and a urethane bond in the main chain thereof, the Comparative Resin c being shown in Comparative Examples 3A and 3B described below.

The specific resin of the embodiment including the unit (1) differs from Comparative Resin c in that the specific resin includes a carbonate bond, an amide bond, or a urethane bond in the main chain thereof, whereas Comparative Resin c does not include any of these bonds in the main chain thereof.

In the case where an ink that contains the specific resin of the embodiment including the unit (1) is used, the hardness, adhesion, and scratch resistance of an image to be formed are better than those in the case where an ink that contains Comparative Resin c is used (for example, Comparative Examples 3A and 3B described below).

This may be also because the intermolecular interaction is improved by the presence of a hydrogen-bonding functional group, such as a carbonate bond, an amide bond, or a urethane bond, in the main chain, and a film hardness improves.

The unit (2) that can be included in the specific resin includes an ester bond, a carbonate bond, an amide bond, or a urethane bond in the main chain thereof and a hindered amine structure in a side chain thereof.

The specific resin of an embodiment including the unit (2) differs from Comparative Resin a in that the specific resin includes a hindered amine structure in a side chain thereof, whereas Comparative Resin a does not include a hindered amine structure in a side chain thereof.

In the case where an ink that contains the specific resin of the embodiment including the unit (2) is used, the hardness, adhesion, and scratch resistance of an image to be formed are better than those in the case where an ink that contains Comparative Resin a is used (for example, Comparative Examples 1A and 1B described below).

This may be because the hindered amine structure that is present in the side chain has high mobility and high reactivity, and thus the ink containing the specific resin of the embodiment including the unit (2) has good curing sensitivity.

The specific resin of the embodiment including the unit (2) differs from Comparative Resin c in that the specific resin includes an ester bond, a carbonate bond, an amide bond, or a urethane bond in the main chain thereof, whereas Comparative Resin c does not include any of these bonds in the main chain thereof.

In the case where an ink that contains the specific resin of the embodiment including the unit (2) is used, the hardness, adhesion, and scratch resistance of an image to be formed are better than those in the case where an ink that contains Comparative Resin c is used (for example, Comparative Examples 3A and 3B described below).

This may be because the intermolecular interaction is improved by the presence of a hydrogen-bonding functional group, such as a carbonate bond, an amide bond, or a urethane bond, in the main chain, and a film hardness improves.

As described above, according to the ink of the present disclosure, since the specific resin contained in the ink includes at least one of the unit (1) or the unit (2), an image to be formed has good hardness, adhesion, and scratch resistance compared with an existing ink (for example, ink including Comparative Resin a or c).

Specific Resin

The ink of the present disclosure contains at least one specific resin.

The specific resin includes at least one hindered unit (that is, at least one of the unit (1) or the unit (2)) as described above.

Unit (1)

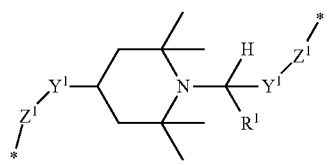

In the unit (1), $R^1$ represents a hydrogen atom or an alkyl group having 1 to 3 carbon atoms; two $Y^1$ each independently represent a single bond or a divalent organic group having 1 to 20 carbon atoms; two $Z^1$ each independently represent a single bond, a carbonate bond (that is, an —OC(=O)O— bond), an amide bond (that is, a —C(=O)NH— bond), or a urethane bond (that is an —OC(=O)NH— bond); and two * each represent a binding site.

Provided that, in a case where one of two $Z^1$ is a single bond, the other is not a single bond.

$R^1$ in the unit (1) is preferably a hydrogen atom, a methyl group, or an ethyl group, more preferably a hydrogen atom or a methyl group, and particularly preferably a hydrogen atom.

Two $Y^1$ in the unit (1) each independently represent a single bond or a divalent organic group having 1 to 20 carbon atoms.

The divalent organic group having 1 to 20 carbon atoms and represented by $Y^1$ is preferably an alkylene group having 1 to 3 carbon atoms, a group (L11) below, a group (L12) below, a group (L13) below, or a group (L14) below.

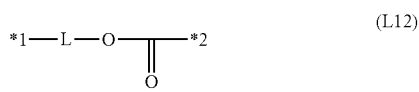

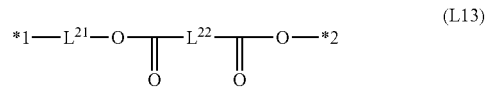

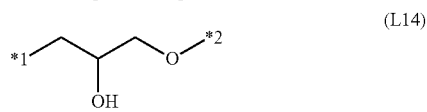

In the group (L11), L represents an alkylene group having 1 to 3 carbon atoms, n represents an integer of 1 to 4, *1 represents a binding site on the $Z^1$ side in the unit (1), and *2 represents a binding site on the carbon atom side in the unit (1). When n is an integer of 2 to 4, a plurality of L may be the same of different.

In the group (L12), L represents an alkylene group having 1 to 3 carbon atoms, *1 represents a binding site on the $Z^1$ side in the unit (1), and *2 represents a binding site on the carbon atom side in the unit (1).

In the group (L13), $L^{21}$ and $L^{22}$ each independently represent an alkylene group having 1 to 3 carbon atoms, *1 represents a binding site on the $Z^1$ side in the unit (1), and *2 represents a binding site on the carbon atom side in the unit (1).

In the group (L14), *1 represents a binding site on the $Z^1$ side in the unit (1), and *2 represents a binding site on the carbon atom side in the unit (1).

In the group (L11), n is preferably an integer of 1 to 3, more preferably 1 or 2, and particularly preferably 1.

Two $Y^1$ are particularly preferably each independently a single bond or an alkylene group having 1 to 3 carbon atoms.

In the unit (1), two $Z^1$ each independently represent a single bond, a carbonate bond (that is, an —OC(=O)O— bond), an amide bond (that is, a —C(=O)NH— bond), or a urethane bond (that is an —OC(=O)NH— bond). Provided that, in a case where one of two $Z^1$ is a single bond, the other is not a single bond.

Two $Z^1$ are each preferably a urethane bond.

Specific examples of the unit (1) are shown below, but the unit (1) is not limited to the specific examples below.

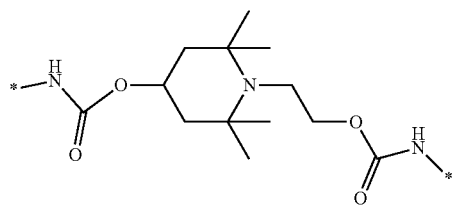
(1-1)

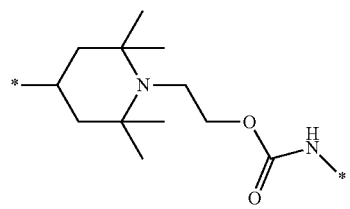
(1-2)

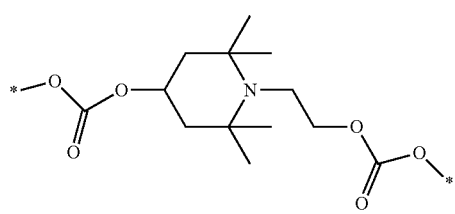
(1-3)

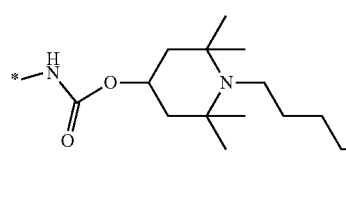
(1-4)

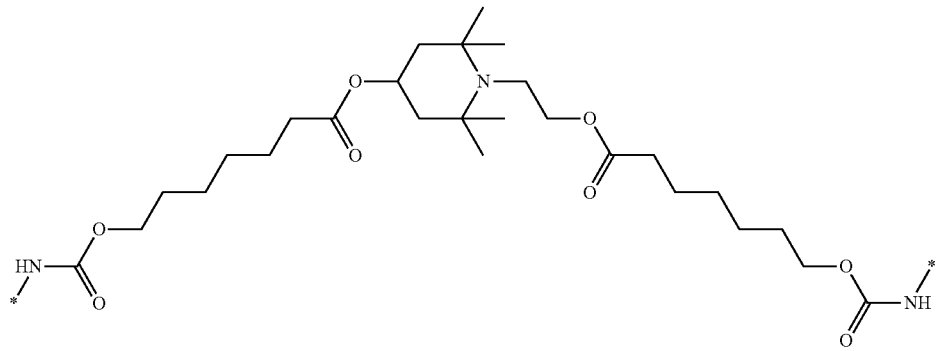
(1-5)

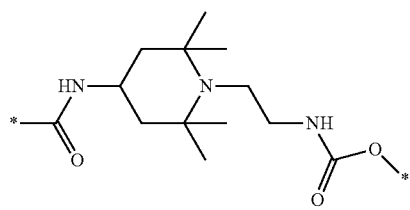
(1-6)

A compound for forming the unit (1) (hereinafter also referred to as a "compound for the unit (1)") is preferably a diol compound, a dicarboxylic acid compound, a diamine compound, or a diisocyanate compound.

For example, a reaction between a diol compound serving as the compound for the unit (1) and a diisocyanate compound produces the unit (1) of an embodiment in which two $Z^1$ are each a urethane bond (for example, the unit (1-1)).

A reaction between a diol compound serving as the compound for the unit (1) and phosgene, a phosgene equivalent, or a carbonic acid ester produces the unit (1) of an embodiment in which one of two $Z^1$ is a carbonate bond and the other is a single bond (for example, the unit (1-2)).

A reaction between a diol compound serving as the compound for the unit (1); phosgene, a phosgene equivalent, or a carbonic acid ester; and a diol compound that is not the compound for the unit (1) produces the unit (1) of an embodiment in which two $Z^1$ are each a carbonate bond (for example, the unit (1-3)).

In the present specification, the phosgene equivalent is a compound that decomposes in the reaction system to produce phosgene. Examples of the phosgene equivalent include diphosgene and triphosgene.

Examples of the carbonic acid ester include dimethyl carbonate and diethyl carbonate.

A reaction between a dicarboxylic acid compound serving as the compound for the unit (1) and a diamine compound produces the unit (1) of an embodiment in which two $Z^1$ are each an amide bond.

A reaction between a diamine compound serving as the compound for the unit (1) and a dicarboxylic acid compound also produces the unit (1) of the embodiment in which two $Z^1$ are each an amide bond.

A reaction between a diisocyanate compound serving as the compound for the unit (1) and a diol compound produces the unit (1) of the embodiment in which two $Z^1$ are each a urethane bond.

Unit (2)

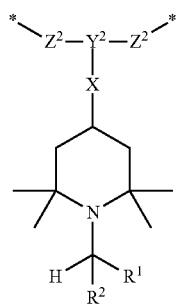

In the unit (2), $R^1$ represents a hydrogen atom or an alkyl group having 1 to 3 carbon atoms; $R^2$ represents a hydrogen atom or a hydrocarbon group having 1 to 12 carbon atoms; X represents an ether bond (that is, an —O— bond) or an ester bond (that is, a —C(=O)O— bond); $Y^2$ represents a trivalent organic group having 1 to 20 carbon atoms; two $Z^2$ each independently represent a single bond, an ester bond (that is, a —C(=O)O— bond), a carbonate bond (that is, an —OC(=O)O— bond), an amide bond (that is, a —C(=O)NH— bond), or a urethane bond (that is, an —OC(=O)NH— bond), and two * each represent a binding site.

Provided that, in a case where one of two $Z^2$ is a single bond, the other is not a single bond.

$R^1$ in the unit (2) is preferably a hydrogen atom, a methyl group, or an ethyl group, more preferably a hydrogen atom or a methyl group, and particularly preferably a hydrogen atom.

$R^2$ in the unit (2) represents a hydrogen atom or a hydrocarbon group having 1 to 12 carbon atoms.

The hydrocarbon group having 1 to 12 carbon atoms and represented by $R^2$ is preferably an alkyl group having 1 to 12 carbon atoms, an aryl group having 6 to 12 carbon atoms, or an aralkyl group having 7 to 12 carbon atoms.

The hydrocarbon group having 1 to 12 carbon atoms and represented by $R^2$ may be substituted with a hydroxy group or a methoxy group.

$R^2$ is preferably a hydrogen atom or an alkyl group having 1 to 3 carbon atoms, more preferably a hydrogen atom, a methyl group, or an ethyl group, and particularly preferably a hydrogen atom or a methyl group.

X represents an ether bond (that is, an —O— bond) or an ester bond (that is, a —C(=O)O— bond).

When X is an ester bond, the configuration of this ester bond is not particularly limited. However, the configuration is preferably one in which the carbonyl carbon atom in the ester bond is disposed on the $Y^2$ side in the unit (2).

$Y^2$ represents a trivalent organic group having 1 to 20 carbon atoms.

Specific examples of $Y^2$ (group (Y2-1) to group (Y2-10)) are shown below, but $Y^2$ is not limited to the specific examples below. In the specific examples, * represents a site bound to $Z^2$, and ** represents a site bound to X.

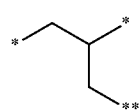
(Y2-1)

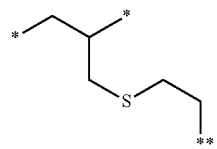
(Y2-2)

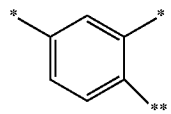
(Y2-3)

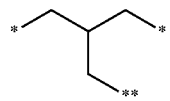
(Y2-4)

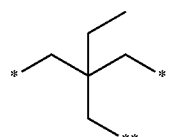
(Y2-5)

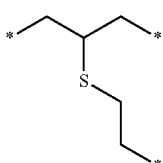
(Y2-6)

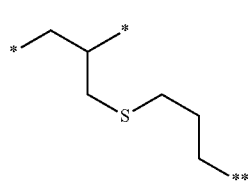
(Y2-7)

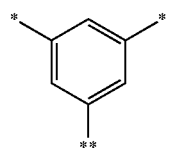
(Y2-8)

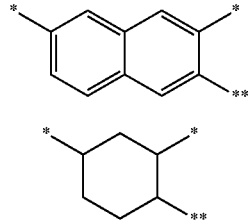
(Y2-9)

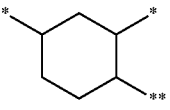
(Y2-10)

Two $Z^2$ each independently represent a single bond, an ester bond (that is, a —C(=O)O— bond), a carbonate bond (that is, an —OC(=O)O— bond), an amide bond (that is, a —C(=O)NH— bond), or a urethane bond (that is, an —OC(=O)NH— bond).

Two $Z^2$ are preferably each independently an ester bond, an amide bond, or a urethane bond, and more preferably an ester bond or a urethane bond from the viewpoint of further improving adhesion of an image (that is, adhesion to a substrate).

Specific examples of the unit (2) are shown below, but the unit (2) is not limited to the specific examples below.

(2-1)
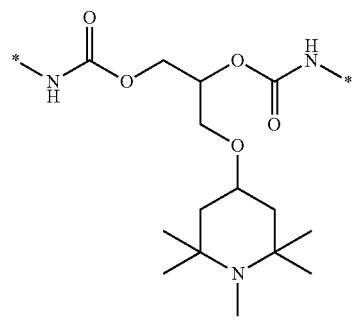
(2-2)
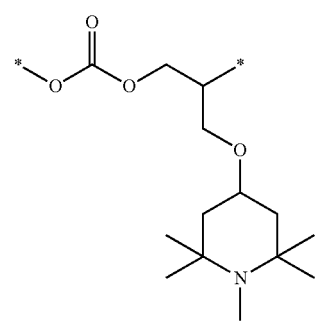
(2-3)
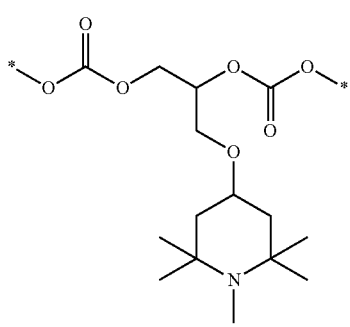
(2-4)
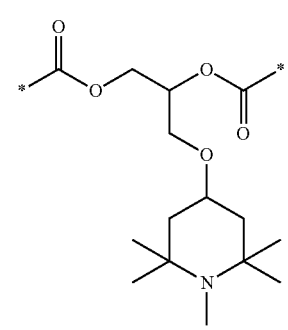
(2-5)
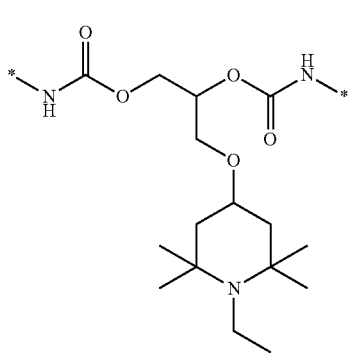
-continued
(2-5)
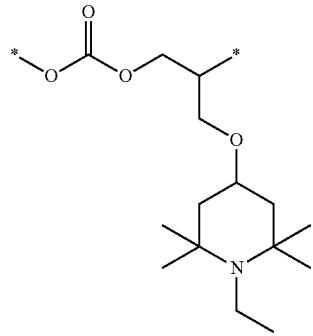
(2-7)
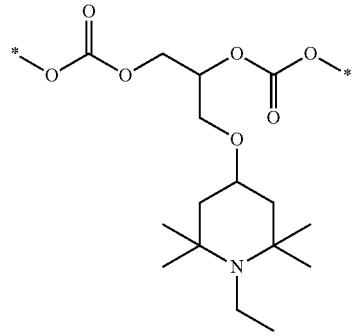
(2-8)
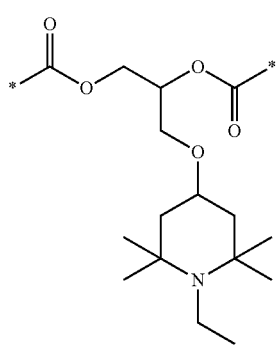
(2-9)
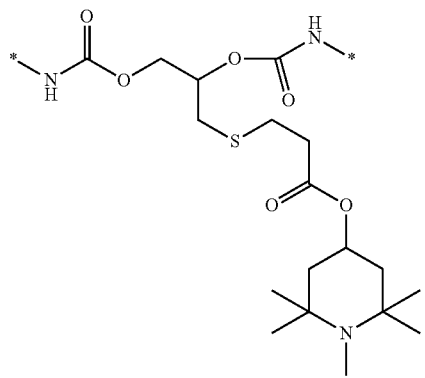

(2-10)
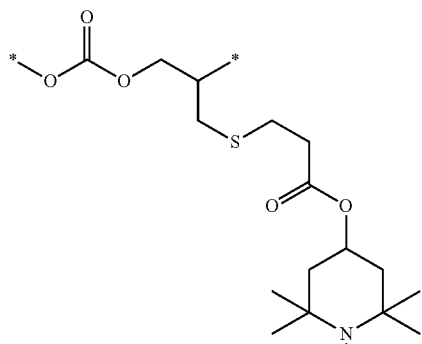
(2-11)
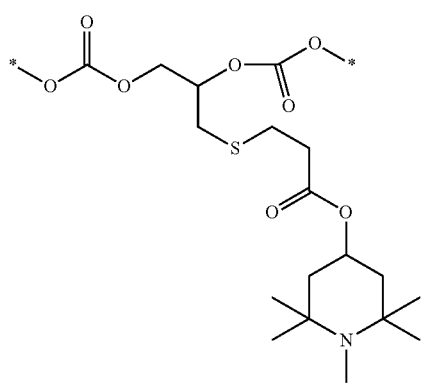
(2-12)
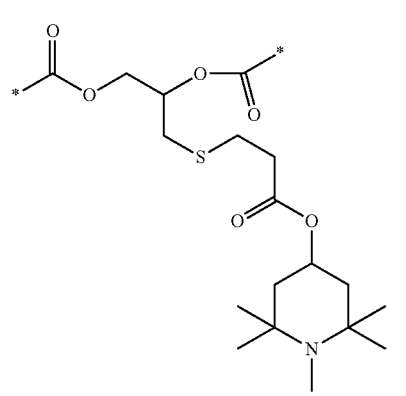
(2-13)
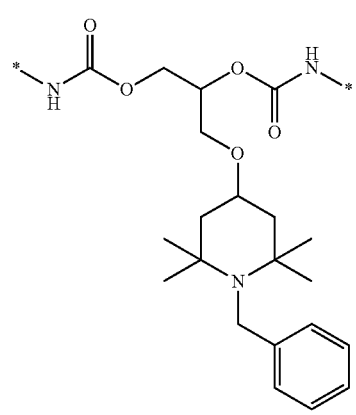
(2-14)
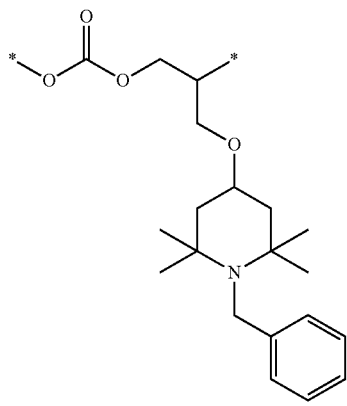
(2-15)
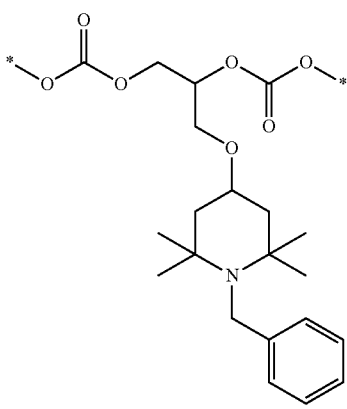
(2-16)
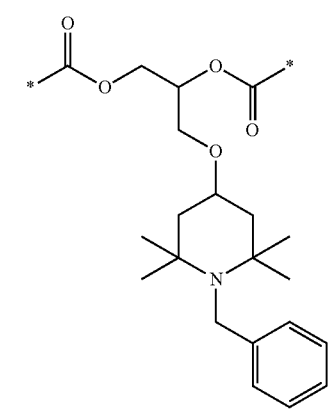
(2-17)
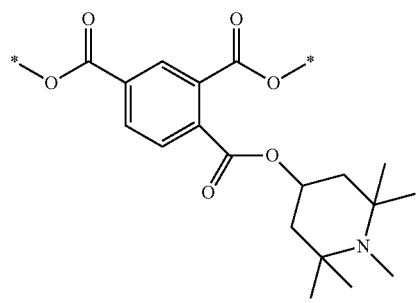

(2-18)

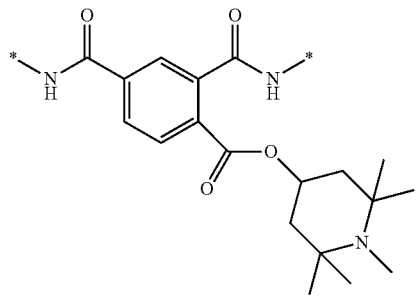

A compound for forming the unit (2) (hereinafter also referred to as a "compound for the unit (2)") is preferably a diol compound, a dicarboxylic acid compound, a diamine compound, or a diisocyanate compound.

For example, a reaction between a diol compound serving as the compound for the unit (2) and a diisocyanate compound produces the unit (2) of an embodiment in which two $Z^2$ are each a urethane bond (for example, the unit (2-1)).

A reaction between a diol compound serving as the compound for the unit (2) and phosgene, a phosgene equivalent, or a carbonic acid ester produces the unit (2) of an embodiment in which one of two $Z^2$ is a carbonate bond and the other is a single bond (for example, the unit (2-2)). The phosgene, the phosgene equivalent, or the carbonic acid ester (including specific examples thereof) is as described above.

A reaction between a diol compound serving as the compound for the unit (2); phosgene, a phosgene equivalent, or a carbonic acid ester; and a diol compound that is not the compound for the unit (2) produces the unit (2) of an embodiment in which two $Z^2$ are each a carbonate bond (for example, the unit (2-3)).

A reaction between a dicarboxylic acid compound serving as the compound for the unit (2) and a diamine compound produces the unit (2) of an embodiment in which two $Z^2$ are each an amide bond.

A reaction between a diamine compound serving as the compound for the unit (2) and a dicarboxylic acid compound also produces the unit (2) of the embodiment in which two $Z^2$ are each an amide bond.

A reaction between a diisocyanate compound serving as the compound for the unit (2) and a diol compound produces the unit (2) of the embodiment in which two $Z^2$ are each a urethane bond.

The specific resin preferably includes the unit (2).

When the specific resin includes the unit (2), the hardness and scratch resistance of an image further improve. Specifically, the unit (2), which includes a hindered amine structure in a side chain portion, has a high effect of improving the hardness and scratch resistance of an image compared with the unit (1), which includes a hindered amine structure in a main chain portion. This may be because the hindered amine structure included in the side chain portion has better mobility and reactivity than the hindered amine structure included in the main chain portion, and thus curing sensitivity is improved by incorporating the unit (2) in the specific resin.

A ratio of an amount of the unit (2) to a total amount of the unit (1) and the unit (2) in the specific resin is preferably 60% by mole to 100% by mole, and more preferably 80% by mole to 100% by mole.

A ratio of a total amount of the unit (1) and the unit (2) with respect to a total amount of all the structural units of the specific resin is preferably 10% by mole or more and more preferably 20% by mole or more from the viewpoint of further improving the hardness of an image, adhesion of an image, and scratch resistance of an image.

The ratio of the total amount of the unit (1) and the unit (2) may be 100% by mole. That is, the specific resin may be a resin consisting of the unit (1) and/or the unit (2).

The ratio of the total amount of the unit (1) and the unit (2) may be less than 100% by mole. That is, the specific resin may include a structural unit (hereinafter also referred to as "other structural unit") other than the unit (1) and the unit (2).

Needless to say, when the specific resin includes the unit (1) and does not include the unit (2), the total amount of the unit (1) and the unit (2) refers to the amount of the unit (1). Similarly, when the specific resin includes the unit (2) and does not include the unit (1), the total amount of the unit (1) and the unit (2) refers to the amount of the unit (2).

Other Structural Unit

The specific resin may include another structural unit (specifically, a unit other than the unit (1) and the unit (2); hereinafter also referred to as "other unit").

When the specific resin satisfies at least one of a condition that "the specific resin includes the unit (1), and two $Z^1$ are each independently an amide bond or a urethane bond" or a condition that "the specific resin includes the unit (2), and two $Z^2$ are each independently an ester bond, an amide bond, or a urethane bond", the specific resin preferably includes the other unit as a unit adjacent to the unit (1) or the unit (2). In this case, the unit (1) or the unit (2), and the other unit are preferably alternately arranged.

The other unit that can be included in the specific resin may be one unit or two or more units.

The number of carbon atoms of the other unit is preferably 2 to 400, preferably 2 to 300, more preferably 2 to 200, still more preferably 2 to 100, and particularly preferably 2 to 20.

Examples of the other unit include alkylene groups (more specifically, alkylene groups that may include an alicyclic structure); arylene groups; and divalent organic groups having an alkylene group (more specifically, an alkylene groups that may include an alicyclic structure) or an arylene group on each terminal.

Each of the alkylene groups, the arylene groups, and the divalent groups having an alkylene group or an arylene group on each terminal may have a substituent.

Examples of the substituent include halogen atoms (such as a fluorine atom, a chlorine atom, a bromine atom, or an iodine atom, preferably a fluorine atom, a chlorine atom, or a bromine atom), alkyl groups, alkoxy groups, and a (meth) acryloyloxymethyl group.

Specific examples of the other unit include, but are not limited to, units (3-1) to (3-14), units (4-1) to (4-20), units (5-1) to (5-10), a unit (6-1), and units (7-1) to (7-6) shown below.

An attention is paid to a compound for forming the other unit (hereinafter also referred to as a "compound for forming the other unit"). Examples of the other unit include a residue formed by removing two isocyanate groups from a diisocyanate compound serving as the compound for forming the other unit, a residue formed by removing two hydroxy groups from a diol compound serving as the compound for forming the other unit, a residue formed by removing two carboxy groups from a dicarboxylic acid compound serving as the compound for forming the other unit, and a residue formed by removing two amino groups from a diamine compound serving as the compound for forming the other unit.

The specific resin preferably includes, as the other unit, a unit that has a ring structure. In this case, the hardness of an image further improves. This may be because the incorporation of the unit including a ring stricture in the specific resin increases the glass transition point ($T_g$) of the specific resin.

In the unit that has a ring structure, the ring structure may be contained in the main chain or a side chain.

The unit that has a ring structure is preferably a divalent organic group that satisfies two conditions: the organic group includes a ring structure; and the organic group includes an alkylene group (specifically, a linear, branched, or cyclic alkylene group) or an arylene group on each terminal thereof.

Examples of the ring structure include alicyclic structures and aromatic ring structures.

Examples of the alicyclic structures include a cyclohexane structure, a bicyclohexane structure, a bicyclodecane structure, a norbornane structure (that is, a dicyclopentane structure), an adamantane structure, and a tricyclodecane structure.

Examples of the aromatic ring structures include a benzene structure, a naphthalene structure, a biphenyl structure, and structures (such as a diphenylmethane structure, a 2,2-diphenylpropane structure, and a diphenylsulfone structure) formed by removing two phenolic hydroxy groups from a bisphenol (such as bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, or bisphenol Z).

The ring structure may be substituted with a halogen atom (for example, a fluorine atom, a chlorine atom, a bromine atom, or an iodine atom, and preferably a fluorine atom, a chlorine atom, or a bromine atom).

Specific examples of the unit including an aromatic ring structure include, but are not limited to, the units (4-1) to (4-20) shown below.

Specific examples of the unit including an alicyclic structure include, but are not limited to, the units (5-1) to (5-10) shown below.

From the viewpoint of further improving the hardness of an image, the specific resin preferably includes an ethylenically unsaturated bond (hereinafter also referred to as "C═C").

When the specific resin has an ethylenically unsaturated bond, the specific resin preferably includes an ethylenically unsaturated group as a group including an ethylenically unsaturated bond.

The ethylenically unsaturated group is preferably a (meth)acryloyl group, a vinyl group, an allyl group, or a styryl group, more preferably a (meth)acryloyl group, a vinyl group, or an allyl group, and particularly preferably a (meth)acryloyl group.

The specific resin more preferably includes a unit including an ethylenically unsaturated bond (preferably an ethylenically unsaturated group) and particularly preferably include, as the other unit, a unit including an ethylenically unsaturated bond (preferably an ethylenically unsaturated group).

A specific example of the unit including an ethylenically unsaturated bond is the unit (6-1) shown below, but the unit including an ethylenically unsaturated bond is not limited to the unit (6-1).

The specific resin preferably has a branched structure X described below.

The branched structure X (hereinafter also referred to as a "branching X") is an alkylene group having 2 or more carbon atoms and substituted with a substituent.

The substituent in the branching X is at least one selected from the group consisting of a linear alkyl group having 2 or more carbon atoms, a branched alkyl group having 3 or more carbon atoms, a linear alkoxy group having 2 or more carbon atoms, a branched alkoxy group having 3 or more carbon atoms, a linear alkoxyalkyl group having 2 or more carbon atoms, and a branched alkoxyalkyl group having 3 or more carbon atoms.

The incorporation of the branching X in the specific resin further improves ejection stability when an ink is ejected from nozzles of an ink jet head (hereinafter also referred to as "ejection stability of an ink"). This may be because the incorporation of the branching X in the specific resin decreases the viscosity of the ink.

The specific resin preferably includes a unit including a branching X and more preferably includes a unit including a branching X as the other unit (that is, a unit other than the unit (1) and the unit (2)).

Specific examples of the unit including a branching X include, but are not limited to, the units (7-1) to (7-6) shown below.

Specific examples (the units (3-1) to (3-14), the units (4-1) to (4-20), the units (5-1) to (5-10), the unit (6-1), and the units (7-1) to (7-6)) of the other unit (that is, a unit other than the unit (1) and the unit (2)) are shown below. However, the other unit is not limited to the specific examples below.

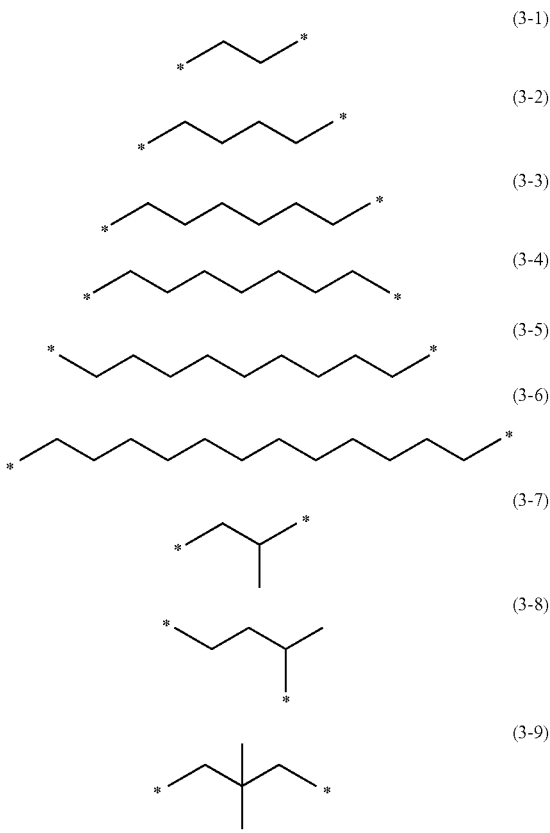

-continued
(3-10)
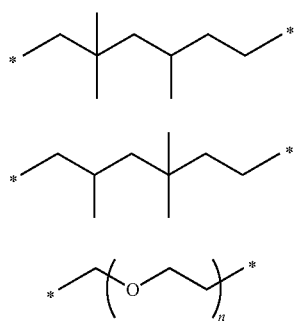
(3-11)
(3-12)
n = 2~100
(3-13)
n = 2~100
(3-14)
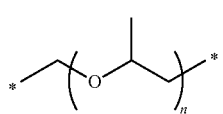
(4-1)
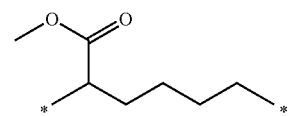
(4-2)
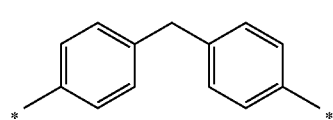
(4-3)
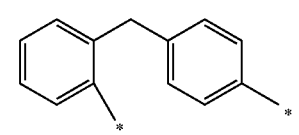
(4-4)
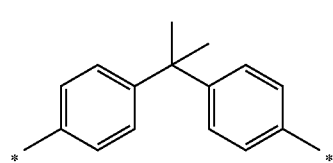
(4-5)
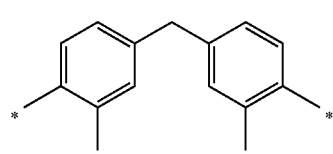
(4-6)
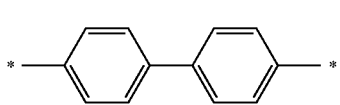
(4-7)
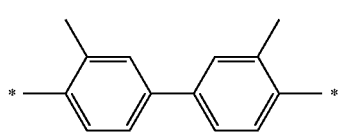
(4-8)
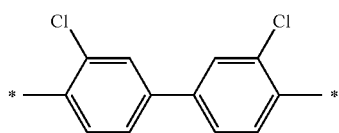
(4-9)
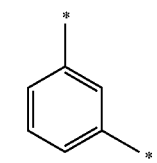
(4-10)
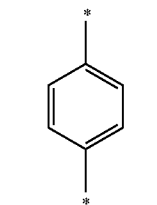
(4-11)
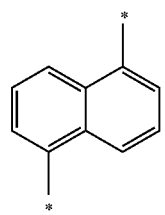
(4-12)
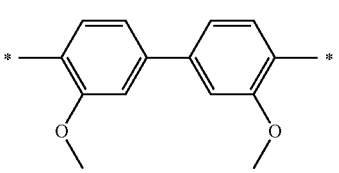
(4-13)
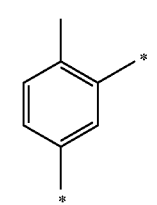
(4-14)
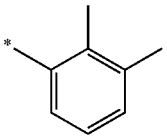
(4-15)
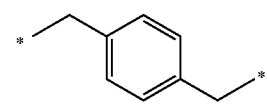

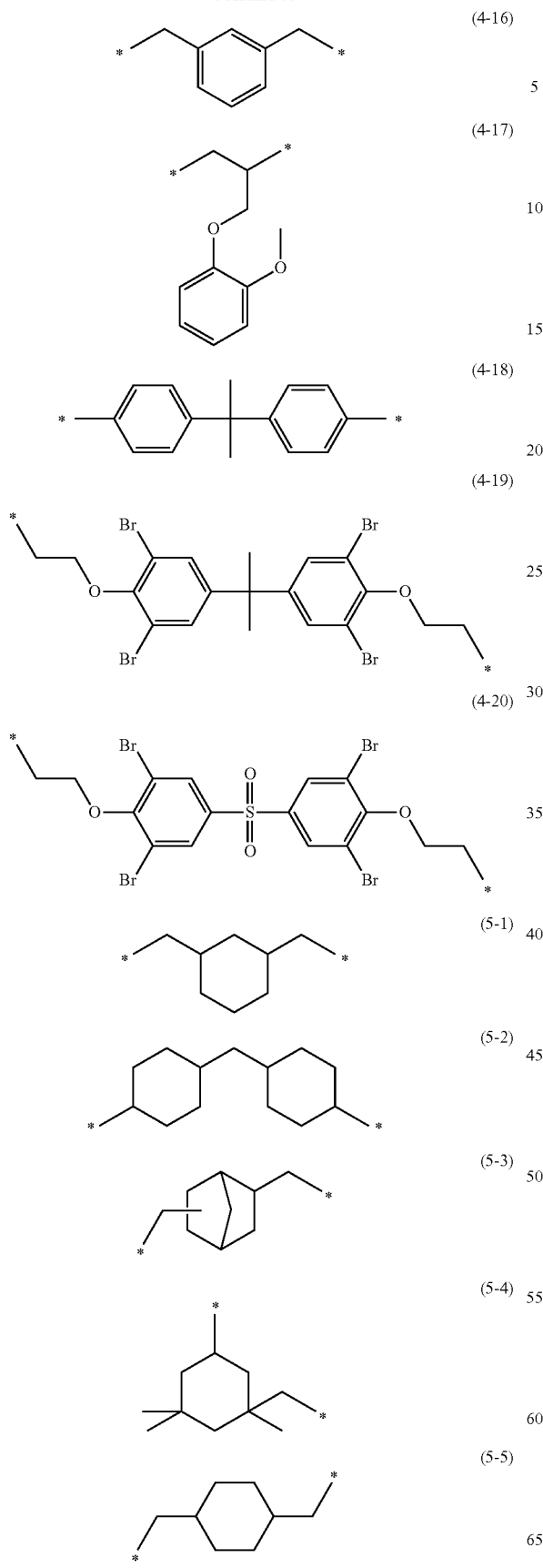

(7-5)

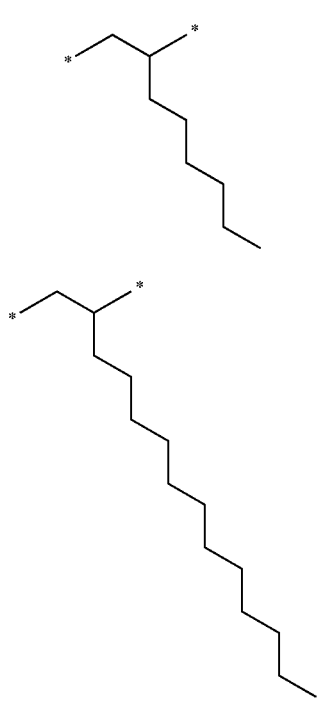

(7-6)

A compound for forming the other unit (hereinafter also referred to as a "compound for the other unit") is preferably a diisocyanate compound, a diol compound, a dicarboxylic acid compound, or a diamine compound, more preferably a diisocyanate compound, a diol compound, a dicarboxylic acid compound, and particularly preferably a diisocyanate compound or a diol compound.

For example, a reaction between a diisocyanate compound serving as the compound for the other unit and a diol compound serving as the compound for the unit (1) produces a specific resin having a structure in which the unit (1) of an embodiment in which two $Z^1$ are each a urethane bond and the other unit are alternately arranged.

A reaction between a diisocyanate compound serving as the compound for the other unit and a diol compound serving as the compound for the unit (2) produces a specific resin having a structure in which the unit (2) of an embodiment in which two $Z^2$ are each a urethane bond and the other unit are alternately arranged.

A reaction between a diol compound serving as the compound for the other unit and a dicarboxylic acid compound serving as the compound for the unit (2) produces a specific resin having a structure in which the unit (2) of an embodiment in which two $Z^2$ are each an ester bond and the other unit are alternately arranged.

A reaction between a diol compound serving as the compound for the other unit and a diisocyanate compound serving as the compound for the unit (1) produces a specific resin having a structure in which the unit (1) of the embodiment in which two $Z^1$ are each a urethane bond and the other unit are alternately arranged.

A reaction between a diol compound serving as the compound for the other unit and a diisocyanate compound serving as the compound for the unit (2) produces a specific resin having a structure in which the unit (2) of the embodiment in which two $Z^2$ are each a urethane bond and the other unit are alternately arranged.

A reaction between a dicarboxylic acid compound serving as the compound for the other unit and a diol compound serving as the compound for the unit (2) produces a structure in which the unit (2) of the embodiment in which two $Z^2$ are each an ester bond and the other unit are alternately arranged.

A reaction between a dicarboxylic acid compound serving as the compound for the other unit and a diamine compound serving as the compound for the unit (1) produces a structure in which the unit (1) of an embodiment in which two $Z^1$ are each an amide bond and the other unit are alternately arranged.

A reaction between a dicarboxylic acid compound serving as the compound for the other unit and a diamine compound serving as the compound for the unit (2) produces a structure in which the unit (2) of an embodiment in which two $Z^2$ are each an amide bond and the other unit are alternately arranged.

A reaction between a diamine compound serving as the compound for the other unit and a dicarboxylic acid compound serving as the compound for the unit (1) produces a structure in which the unit (1) of the embodiment in which two $Z^1$ are each an amide bond and the other unit are alternately arranged.

A reaction between a diamine acid compound serving as the compound for the other unit and a dicarboxylic acid compound serving as the compound for the unit (2) produces a structure in which the unit (2) of the embodiment in which two $Z^2$ are each an amide bond and the other unit are alternately arranged.

When the specific resin includes the other unit, a ratio of the amount of the other unit to the total amount of all the structural units in the specific resin is preferably 10% by mole or more, more preferably 20% by mole or more, and still more preferably 30% by mole or more.

The upper limit of the ratio of the amount of the other unit depends on the total amount of the unit (1) and the unit (2).

When the specific resin includes the other unit, preferably, the total amount of the unit (1) and the unit (2) is 10% by mole to 90% by mole relative to all the structural units in the specific resin, and the amount of the other unit is 10% by mole to 90% by mole relative to all the structural units in the specific resin; more preferably, the total amount of the unit (1) and the unit (2) is 20% by mole to 80% by mole relative to all the structural units in the specific resin, and the amount of the other unit is 20% by mole to 80% by mole relative to all the structural units in the specific resin; and particularly preferably, the total amount of the unit (1) and the unit (2) is 30% by mole to 70% by mole relative to all the structural units in the specific resin, and the amount of the other unit is 30% by mole to 70% by mole relative to all the structural units in the specific resin.

The specific resin may include, as the other unit, a unit having an aminoalkyl group in addition to the units described above within a range that does not impair storage stability of the ink.

However, from the viewpoint of storage stability of the ink, the content of the unit having an aminoalkyl group and serving as the other unit is preferably 10% by mass or less, more preferably 3% by mass or less, and still more preferably 1% by mass or less relative to the total amount of the specific resin. From the viewpoint of storage stability of the ink, a particularly preferred embodiment is one in which the specific resin does not include a unit having an aminoalkyl group as the other unit.

Amine Value

The amine value of the specific resin is not particularly limited, but is preferably 0.50 mmol/g or more, more preferably 0.70 mmol/g or more, still more preferably 1.00 mmol/g or more, and particularly preferably 1.10 mmol/g or more.

When the specific resin has an amine value of 0.50 mmol/g or more, the hardness of an image and scratch resistance of an image further improve.

Herein, the amine value of a specific resin means the total number of millimoles of amino groups included in the specific resin having a mass of 1 g.

The amine value of the specific resin correlates with the total amount of the unit (1) and the unit (2) in the specific resin.

The amine value of the specific resin means a value measured as described below.

About 0.5 g of a specific resin to be measured is weighed in a 100-mL beaker, and the weighed value W1 (g) is recorded. Subsequently, a liquid mixture of 54 mL of tetrahydrofuran (THF) and 6 mL of distilled water is added to dilute the weighed specific resin. Thus, a sample 1 for measuring an amine value is prepared.

The resulting sample 1 for measuring an amine value is titrated by using a 0.1 N (=0.1 mol/L) aqueous hydrochloric acid solution as a titrant. The amount of titrant necessary to reach the equivalence point is recorded as F1 (mL). In the case where a plurality of equivalence points are determined in the titration, the value of an equivalence point at the maximum amount of titration is used. Herein, the "maximum amount of titration F1 (mL)" corresponds to the amount of amino groups included in the specific resin.

Amine value (mmol/g)=0.1 (mol/L)×$F1$ (mL)/$W1$

The "amino group" in the present disclosure includes not only a primary amino group but also a secondary amino group and a tertiary amino group, and includes not only a terminal amino group but also, for example, an amino group included in a main chain or in a side chain (such as —N(R)— where R represents a hydrogen atom or an organic group).

From the viewpoint of solvent resistance, the amino group in the specific resin is preferably a secondary amino group and a tertiary amino group, and more preferably a tertiary amino group.

The specific resin preferably has an amino group in a side chain thereof.

In the present disclosure, the "main chain" refers to the relatively longest bonding chain in a molecule of a polymer compound that constitutes a resin, and the "side chain" refers to a molecular chain branched from the main chain.

The upper limit of the amine value of the specific resin is not particularly limited.

From the viewpoint of suitability of the production of the specific resin, the amine value is preferably 5.00 mmol/g or less.

The weight-average molecular weight of the specific resin is preferably from 1,000 to 100,000, more preferably from 1,000 to 50,000, still more preferably from 3,000 to 40,000, and particularly preferably from 5,000 to 30,000.

When the weight-average molecular weight of the specific resin is 1,000 or more, the film hardness of an image further improves.

When the weight-average molecular weight of the specific resin is 100,000 or less, the storage stability and ejection stability of the ink further improve.

In the present specification, the weight-average molecular weight (Mw) is a value measured by gel permeation chromatography (GPC).

In the measurement by gel permeation chromatography (GPC), HLC (registered trademark)-8020GPC (Tosoh Corporation) is used as a measurement apparatus, three TSKgel (registered trademark) Super Multipore HZ-H columns (4.6 mm ID×15 cm, Tosoh Corporation) are used as columns, and THF (tetrahydrofuran) is used as an eluant. Regarding measurement conditions, the measurement is conducted at a sample concentration of 0.45% by mass, at a flow rate of 0.35 mL/min, with an amount of sample injected of 10 μL, and at a measurement temperature of 40° C. by using a refractive index (RI) detector.

A calibration curve is prepared from eight samples of "Standard sample TSK standard, polystyrene" manufactured by Tosoh Corporation: "F-40", "F-20", "F-4", "F-1", "A-5000", "A-2500", and "A-1000" and "n-propylbenzene".

The method for synthesizing the specific resin is not limited, and known methods can be suitably employed.

For example, a reaction between the above-described compound for forming the unit (1) and the above-described compound for forming the other unit enables the synthesis of a specific resin of an embodiment, the specific resin having a structure in which the unit (1) of an embodiment where two $Z^1$ are each a urethane bond, a carbonate bond, or an amide bond and the other unit are alternately arranged.

A reaction between the above-described compound for forming the unit (1) and phosgene, a phosgene equivalent, or a carbonic acid ester enables the synthesis of a specific resin of an embodiment, the specific resin having a structure in which a plurality of units (1) of an embodiment where one of two $Z^1$ is a carbonate bond and the other is a single bond are continuously arranged.

A reaction between the above-described compound for forming the unit (2) and the above-described compound for forming the other unit enables the synthesis of a specific resin of an embodiment, the specific resin having a structure in which the unit (2) of an embodiment where two $Z^2$ are each a urethane bond, an ester bond, a carbonate bond, or an amide bond and the other unit are alternately arranged.

A reaction between the above-described compound for forming the unit (2) and phosgene, a phosgene equivalent, or a carbonic acid ester enables the synthesis of a specific resin of an embodiment, the specific resin having a structure in which a plurality of units (2) of an embodiment where one of two $Z^2$ is a carbonate bond and the other is a single bond are continuously arranged.

The content of the specific resin is preferably from 0.5% by mass to 10.0% by mass, more preferably from 1.0% by mass to 8.0% by mass, still more preferably from 1.5% by mass to 7.5% by mass, and particularly preferably from 2.0% by mass to 7.0% by mass, relative to the total amount of the ink.

When the content of the specific resin relative to the total amount of the ink is 0.5% by mass or more, the hardness of an image and scratch resistance of an image further improve.

When the content of the specific resin is 10.0% by mass or less, the storage stability of the ink further improves.

Specific Monomer

The ink of the present disclosure contains a specific monomer (that is, at least one of a monofunctional radical-polymerizable monomer or a bifunctional radical-polymerizable monomer).

The ink of the present disclosure may be an embodiment in which both at least one monofunctional radical-polymerizable monomer and at least one bifunctional radical-polymerizable monomer are contained as the specific monomer, an embodiment in which at least one monofunctional radical-polymerizable monomer is contained as the specific monomer and no bifunctional radical-polymerizable monomer is contained, or an embodiment in which at least one bifunctional radical-polymerizable monomer is contained as the specific monomer and no monofunctional radical-polymerizable monomer is contained.

The total content of the specific monomer relative to the total amount of the ink of the present disclosure is 50% by mass or more.

A total content of the specific monomer of 50% by mass or more means that the ink of the present disclosure is an ink that contains the specific monomer as a main liquid component.

The specific monomer has a function of providing fluidity to the ink (that is, a function of maintaining the liquid state of the ink) and a function of providing photocurability to the ink.

The content of the specific monomer relative to the total amount of the ink of the present disclosure is 50% by mass or more as described above. The content of the specific monomer is preferably 60% by mass or more, and more preferably 65% by mass or more.

The upper limit of the content of the specific monomer is not particularly limited. The upper limit can be, for example, 95% by mass or 90% by mass.

Examples of the monofunctional radical-polymerizable monomer (hereinafter also referred to as "monofunctional monomer") serving as the specific monomer include N-vinyl compounds such as N-vinylcaprolactam and N-vinylpyrrolidone; monofunctional acrylate compounds such as 2-phenoxyethyl acrylate (PEA), benzyl acrylate, cyclic trimethylolpropane formal acrylate (CTFA), isobornyl acrylate (IBOA), tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethylcyclohexyl acrylate (TMCHA), dicyclopentenyl acrylate (DCPA), 4-tert-butyl cyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxypolyethylene glycol acrylate, and nonylphenoxypolypropylene glycol acrylate; monofunctional methacrylate compounds such as 2-phenoxyethyl methacrylate, benzyl methacrylate, isobornyl methacrylate (DCPMA), tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethylcyclohexyl methacrylate (TMCHMA), dicyclopentenyl methacrylate (DCPMA), 4-tert-butyl cyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxypolyethylene glycol methacrylate, and nonylphenoxypolypropylene glycol methacrylate; monofunctional vinyl ether compounds such as n-propyl vinyl ether, isopropyl vinyl ether, n-butyl vinyl ether, isobutyl vinyl ether, 2-ethylhexyl vinyl ether, cyclohexyl vinyl ether, 2-hydroxyethyl vinyl ether, 4-hydroxybutyl vinyl ether, and cyclohexane dimethanol monovinyl ether; monofunctional acrylamide compounds such as acrylamide, N,N-dimethylacrylamide, N,N-diethylacrylamide, acryloylmorpholine, N-isopropylacrylamide, N-hydroxyethylacrylamide, N-butylacrylamide, N-tert-butylacrylamide, N-(1,1-dimethyl-3-oxobutyl)acrylamide, N-dodecylacrylamide, and N-(butoxymethyl)acrylamide; and monofunctional methacrylamide compounds such as methacrylamide, N-phenylmethacrylamide, N-(methoxymethyl)methacrylamide, N,N-dimethylmethacrylamide, and N-tert-butylmethacrylamide.

Examples of the bifunctional radical-polymerizable monomer (hereinafter also referred to as "bifunctional monomer") serving as the specific monomer include bifunctional acrylate compounds such as hexanediol diacrylate (HDDA), dipropylene glycol diacrylate (DPGDA), polyethylene glycol diacrylate, polypropylene glycol diacrylate, nonanediol diacrylate, decanediol diacrylate, neopentyl glycol diacrylate, polyethylene glycol-modified bisphenol A diacrylate, dioxane glycol diacrylate, cyclohexane dimethanol diacrylate, and tricyclodecane dimethanol diacrylate; 2-(2-vinyloxyethoxy)ethyl acrylate (VEEA); bifunctional vinyl compounds such as 1,4-butanediol divinyl ether, cyclohexanedimethanol divinyl ether, diethylene glycol divinyl ether, and triethylene glycol divinyl ether (DVE3); and bifunctional methacrylate compounds such as hexanediol dimethacrylate, dipropylene glycol dimethacrylate (DPGDMA), polyethylene glycol dimethacrylate, polypropylene glycol dimethacrylate, neopentyl glycol dimethacrylate, and polyethylene glycol-modified bisphenol A dimethacrylate.

Besides the monofunctional radical-polymerizable monomers and the bifunctional radical-polymerizable monomers mentioned above, monofunctional or bifunctional radical-polymerizable monomers that are commercially available or known in the art and that are described in, for example, "Crosslinking Agent Handbook", (1981, Taiseisha Ltd.) edited by Shinzo Yamashita; "UV/EB Curing Handbook (Raw Material Edition)" (1985, Kobunshi Kankokai) edited by Kiyoshi Kato; "Application and Market of UV/EB Curing Technology", p. 79, (1989, CMC Publishing Co., Ltd.) edited by RadTech Japan; and "Polyester Resin Handbook", (1988, Nikkan Kogyo Shimbun, Ltd.) written by Eiichiro Takiyama can also be used as the specific monomer.

The weight-average molecular weight of the specific monomer is preferably 100 or more and less than 1,000, more preferably 100 or more and 800 or less, and still more preferably 150 or more and 700 or less.

The weight-average molecular weight of the specific monomer is a value measured by gel permeation chromatography (GPC).

As described above, the total content of the specific monomer relative to the total amount of the ink of the present disclosure is 50% by mass or more.

The ink of the present disclosure may contain a monomer other than the specific monomer (for example, a tri- or higher functional radical-polymerizable monomer) as long as this condition is satisfied.

Examples of the tri- or higher functional radical-polymerizable monomer serving as the other monomer include tri- or higher functional (meth)acrylate compounds such as pentaerythritol triacrylate, pentaerythritol tetraacrylate, dipentaerythritol pentaacrylate, dipentaerythritol hexaacrylate (DPHA), trimethylolpropane triacrylate, ditrimethylolpropane tetraacrylate, pentaerythritol trimethacrylate, and pentaerythritol tetramethacrylate.

In the ink of the present disclosure, from the viewpoint of further improving the ejection stability of the ink, a ratio of the specific monomer to the total amount of the radical-polymerizable monomer contained is preferably 60% by mass or more and more preferably 80% by mass or more.

From the viewpoint of further improving the hardness of an image, the specific monomer preferably includes a bifunctional monomer. From the viewpoint of further improving the hardness of an image, the bifunctional monomer preferably accounts for 10% by mass or more, more preferably 30% by mass or more, still more preferably 50% by mass or more, and particularly preferably 80% by mass or more of the specific monomer.

Radical-Polymerizable Resin

The ink of the present disclosure can contain a radical-polymerizable resin (hereinafter also simply referred to as a "polymerizable resin"). In this case, the polymerizable resin contained in the ink may be one resin or two or more resins.

When the ink of the present disclosure contains a radical-polymerizable resin, the above-described effect achieved by at least one of the unit (1) or the unit (2) (the effect of suppressing the phenomenon in which radical polymerization is inhibited by oxygen) is exerted not only for radical polymerization of the specific monomer but also for radical polymerization of the radical-polymerizable resin.

Herein, the polymerizable resin refers to a resin having a polymerizable group.

The concept of the polymerizable resin covers oligomers having polymerizable groups and polymers having polymerizable groups.

Example of a resin serving as a base of the polymerizable resin include acrylic resins, urethane resins, polyester resins, polyether resins, polycarbonate resins, epoxy resins, and polybutadiene resins. Of these, resins that have both a hard segment and a soft segment and that are capable of relaxing a stress during curing are preferred from the viewpoint of reducing cure shrinkage. In particular, at least one resin selected from the group consisting of urethane resins, polyester resins, and epoxy resins is more preferred.

The polymerizable group included in the polymerizable resin is preferably a group including an ethylenic double bond and more preferably a group including at least one of a vinyl group or a 1-methylvinyl group.

From the viewpoint of polymerization reactivity and hardness of a film to be formed, the polymerizable group is particularly preferably a (meth)acryloyl group.

These polymerizable groups can be introduced into a resin (a polymer or an oligomer) by a polymer reaction or copolymerization.

A polymerizable group can be introduced into a polymer (or an oligomer) by using, for example, a reaction between a polymer (or an oligomer) having a carboxy group in a side chain and glycidyl methacrylate, or a reaction between a polymer (or an oligomer) having an epoxy group and an ethylenically unsaturated group-containing carboxylic acid such as methacrylic acid. These groups may be used in combination.

The polymerizable resins may be commercially available products on the market.

Examples of the commercially available products of an acrylic resin having a polymerizable group include (ACA) Z200M, (ACA)Z230AA, (ACA)Z251, and (ACA)Z254F (all of which are available from DAICEL-ALLNEX LTD.) and HITALOID 7975D (Hitachi Chemical Company, Ltd.).

Examples of the commercially available products of a urethane resin having a polymerizable group include EBECRYL (registered trademark) 8402, EBECRYL (registered trademark) 8405, EBECRYL (registered trademark) 9270, EBECRYL (registered trademark) 8311, EBECRYL (registered trademark) 8701, KRM8667, and KRM8528 (all of which are available from DAICEL-ALLNEX LTD.); CN964, CN9012, CN968, CN996, CN975, and CN9782 (all of which are available from SARTOMER); UV-6300B, UV-7600B, UV-7605B, UV-7620EA, and UV-7630B (all of which are available from The Nippon Synthetic Chemical Industry Co., Ltd.); U-6HA, U-15HA, U-108A, U-200PA, and UA-4200 (all of which are available from Shin Nakamura Chemical Co., Ltd.); TA 2300, HITALOID 4863, TA 2328, TA 2350, and HITALOID 7902-1 (all of which are available from Hitachi Chemical Company, Ltd.), and 8UA-017, 8UA-239, 8UA-239H, 8UA-140, 8UA-585H, 8UA-347H, and 8UX-015A (all of which are available from Taisei Fine Chemical Co., Ltd.).

Examples of the commercially available products of a polyester resin having a polymerizable group include CN294, CN2254, CN2260, CN2271E, CN2300, CN2301, CN2302, CN2303, and CN2304 (all of which are available from SARTOMER); and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are available from DAICEL-ALLNEX LTD.).

Examples of the commercially available products of a polyether resin having a polymerizable group include BLEMMER (registered trademark) ADE-400A and BLEMMER (registered trademark) ADP-400 (both of which are available from NOF Corporation).

Examples of the commercially available products of a polycarbonate resin having a polymerizable group include polycarbonate diol diacrylate (Ube Industries, Ltd.).

Examples of the commercially available products of an epoxy resin having a polymerizable group include EBECRYL (registered trademark) 3708 (DAICEL-ALLNEX LTD.); CN120, CN120B60, CN120B80, and CN120E50 (all of which are available from SARTOMER); and HITALOID 7851 (Hitachi Chemical Company, Ltd.).

Examples of the commercially available products of a polybutadiene resin having a polymerizable group include CN301, CN303, and CN307 (all of which are available from SARTOMER).

From the viewpoint of combining adhesion and dispersion stability, the weight-average molecular weight of the polymerizable resin is preferably 1,000 or more and 100,000 or less, more preferably 1,000 or more and 40,000 or less, and still more preferably 1,000 or more and 10,000 or less.

The weight-average molecular weight of the polymerizable resin is a value measured by gel permeation chromatography (GPC).

When the ink of the present disclosure contains a polymerizable resin, the content of the polymerizable resin is preferably 0.1% by mass to 10% by mass, more preferably 0.3% by mass to 5.0% by mass, and particularly preferably 1.0% by mass to 3.0% by mass relative to the total amount of the ink.

Photopolymerization Initiator

The ink of the present disclosure preferably contains a photopolymerization initiator.

When the ink of the present disclosure contains a photopolymerization initiator, the photopolymerization initiator contained may be one photopolymerization initiator or two or more photopolymerization initiators.

Known photopolymerization initiators that absorb light (that is, active energy rays) to generate radicals, which are polymerization-initiating species, can be used as the photopolymerization initiators.

Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaaryl biimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

As the photopolymerization initiator, the above compounds (a) to (m) may be used alone or in combination of two or more thereof.

Preferred examples of the (a) carbonyl compounds, the (b) acylphosphine oxide compounds, and the (e) thio compounds include compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77 to 117.

More preferred examples thereof include α-thiobenzophenone compounds described in JP1972-6416B (JP-S47-6416B), benzoin ether compounds described in JP1972-3981B (JP-S47-3981B), α-substituted benzoin compounds described in JP1972-22326B (JP-S47-22326B), benzoin derivatives described in JP1972-23664B (JP-S47-23664B), aroyl phosphonates described in JP1982-30704A (JP-S57-30704A), dialkoxy benzophenones described in JP1985-26483B (JP-S60-26483B), benzoin ethers described in JP1985-26403B (JP-S60-26403B) and JP1987-81345A (JP-S62-81345A), α-aminobenzophenones described in JP1989-34242B (JP-H01-34242B), U.S. Pat. No. 4,318,791A, and EP0284561A1, p-di(dimethylaminobenzoyl)benzene described in JP1990-211452A (JP-H02-211452A), thio-substituted aromatic ketones described in JP1986-194062A (JP-S61-194062A), acylphosphine sulfides described in JP1990-9597B (JP-H02-9597B), acylphosphines described in JP1990-9596B (JP-H02-9596B), thioxanthones described in JP1988-61950B (JP-S63-61950B), and coumarins described in JP1984-42864B (JP-S59-42864B).

Furthermore, the polymerization initiators described in JP2008-105379A and JP2009-114290A are also preferred.

Among these photopolymerization initiators, the (a) carbonyl compounds or the (b) acylphosphine oxide compounds are more preferred. Specific examples thereof include bis(2,4,6-trimethylbenzoyl)-phenylphosphine oxide (for example, IRGACURE (registered trademark) 819 manufactured by BASF), 2-(dimethylamino)-1-(4-morpholinophenyl)-2-benzyl-1-butanone (for example, IRGACURE (registered trademark) 369 manufactured by BASF), 2-methyl-1-(4-methylthiophenyl)-2-morpholinopropan-1-one (for example, IRGACURE (registered trademark) 907 manufactured by BASF), 1-hydroxy-cyclohexyl-phenyl-ketone (for example, IRGACURE (registered trademark) 184 manufactured by BASF), and 2,4,6-trimethylbenzoyl-diphenyl-phosphine oxide (for example, DAROCUR (registered trademark) TPO and LUCIRIN (registered trademark) TPO (both of which are manufactured by BASF).

Of these, from the viewpoints of, for example, improvement of sensitivity and suitability to LED light, the photopolymerization initiator is preferably an (b) acylphosphine oxide compound and more preferably a monoacylphosphine oxide compound (particularly preferably, 2,4,6-trimethylbenzoyl-diphenyl-phosphine oxide) or a bisacylphosphine oxide compound (particularly preferably, bis(2,4,6-trimethylbenzoyl)-phenylphosphine oxide).

When the ink of the present disclosure contains a photopolymerization initiator, the content of the photopolymerization initiator is preferably 1.0% by mass to 25.0% by mass, more preferably 2.0% by mass to 20.0% by mass, and still more preferably 3.0% by mass to 15.0% by mass relative to the total amount of the ink.

Sensitizer

The ink of the present disclosure preferably contains a sensitizer.

When the ink of the present disclosure contains a sensitizer, the sensitizer contained may be one sensitizer or two or more sensitizers.

Herein, the sensitizer is a substance that absorbs specific active energy rays to be in an electronically excited state. The sensitizer in the electronically excited state comes in contact with the photopolymerization initiator to cause actions such as electron transfer, energy transfer, and generation of heat. This accelerates a chemical change in the photopolymerization initiator, that is, decomposition, generation of a radical, an acid, or a base, and the like.

Examples of the sensitizer include benzophenone (BP), thioxanthone, isopropylthioxanthone (ITX), ethyl 4-(dimethylamino) benzoate (EDB), anthraquinone, 3-acylcoumarin derivatives, terphenyl, styryl ketone, 3-(aroylmethylene)thiazoline, camphorquinone, eosin, rhodamine, and erythrosine.

In addition, the compound represented by the general formula (i) described in JP2010-24276A and the compound represented by the general formula (I) described in JP1994-107718A (JP-H06-107718A) can also be suitably used as the sensitizer.

From the viewpoint of suitability to LED light and reactivity with photopolymerization initiators, among the above compounds, at least one selected from the group consisting of thioxanthone, isopropylthioxanthone, ethyl 4-(dimethylamino) benzoate, and benzophenone is preferred as the sensitizer.

When the ink of the present disclosure contains a sensitizer, the content of the sensitizer is preferably 0.5% by mass to 10% by mass, more preferably 1.0% by mass to 7.0% by mass, and particularly preferably 2.0% by mass to 6.0% by mass.

Surfactant

The ink of the present disclosure may contain a surfactant.

Examples of the surfactant include surfactants described in JP1987-173463A (JP-S62-173463A) and JP1987-183457A (JP-S62-183457A). Examples of the surfactant include anionic surfactants such as dialkyl sulfosuccinates, alkylnaphthalene sulfonates, and fatty acid salts; nonionic surfactants such as polyoxyethylene alkyl ethers, polyoxyethylene alkyl allyl ethers, acetylene glycol, polyoxyethylene-polyoxypropylene block copolymers, and siloxanes such as modified polydimethylsiloxane; cationic surfactants such as alkylamine salts and quaternary ammonium salts; and betaine surfactants such as carbobetaine and sulfobetaine.

Organofluorine compounds having no polymerizable groups may be used instead of the surfactants. The organofluorine compounds are preferably hydrophobic. The organofluorine compounds cover, for example, fluorine-containing surfactants, oily fluorine-containing compounds (e.g., fluorine oil), and solid fluorine compound resins (e.g., a tetrafluoroethylene resin). Examples thereof include the compounds described in JP1982-9053B (JP-S57-9053B) (the 8th column to the 17th column) and JP1987-135826A (JP-S62-135826A).

When the ink of the present disclosure contains a surfactant, the content of the surfactant is preferably 0.01% by mass to 5.0% by mass, more preferably 0.1% by mass to 3.0% by mass, and particularly preferably 0.3% by mass to 2.0% by mass relative to the total amount of the ink.

Polymerization Inhibitor

The ink of the present disclosure may contain a polymerization inhibitor.

Examples of the polymerization inhibitor include p-methoxyphenol, quinones (such as hydroquinone, benzoquinone, and methoxybenzoquinone), phenothiazine, catechols, alkylphenols (such as dibutylhydroxytoluene (BHT)), alkyl bisphenols, zinc dimethyldithiocarbamate, copper dimethyldithiocarbamate, copper dibutyldithiocarbamate, copper salicylate, thiodipropionates, mercaptobenzimidazole, phosphites, 2,2,6,6-tetramethylpiperidine-1-oxyl (TEMPO), 2,2,6,6-tetramethyl-4-hydroxypiperidine-1-oxyl (TEMPOL), cupferron A1, and tris(N-nitroso-N-phenylhydroxylamine)aluminum salt.

Of these, at least one selected from the group consisting of p-methoxyphenol, catechols, quinones, alkylphenols, TEMPO, TEMPOL, cupferron A1, and tris(N-nitroso-N-phenylhydroxylamine)aluminum salt is preferred, and at least one selected from the group consisting of p-methoxyphenol, hydroquinone, benzoquinone, BHT, TEMPO, TEMPOL, cupferron A1, and tris(N-nitroso-N-phenylhydroxylamine)aluminum salt is more preferred.

When the ink of the present disclosure contains a polymerization inhibitor, the content of the polymerization inhibitor is preferably 0.01% by mass to 2.0% by mass, more preferably 0.02% by mass to 1.0% by mass, and particularly preferably 0.03% by mass to 0.5% by mass relative to the total amount of the ink.

Solvent

The ink of the present disclosure may contain a solvent.

Examples of the solvent include ketones such as acetone, methyl ethyl ketone, and diethyl ketone; alcohols such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethyl ether.

When the ink of the present disclosure contains a solvent, from the viewpoint of further reducing the effect on a substrate, the content of the solvent is preferably 5% by mass or less, more preferably 0.01% by mass to 5% by mass, and particularly preferably 0.01% by mass to 3% by mass relative to the total amount of the ink.

Water

The ink of the present disclosure may contain a small amount of water.

The ink of the present disclosure is preferably a non-aqueous ink, which contains substantially no water.

Specifically, the content of water is preferably 3% by mass or less, more preferably 2% by mass or less, and particularly preferably 1% by mass or less relative to the total amount of the ink of the present disclosure.

Colorant

The ink of the present disclosure may contain at least one colorant.

The colorant is not particularly limited and can be freely selected from known colorants such as pigments, water-soluble dyes, and disperse dyes and used. Of these colorants, pigments are more preferably included from the viewpoint of good weather resistance and high color reproducibility.

The pigments are not particularly limited and can be appropriately selected according to the purpose. Examples of the pigments include known organic pigments and inorganic pigments. Examples of the pigments further include resin particles dyed with a dyestuff, and commercially available pigment dispersions and surface-treated pigments (for example, dispersions obtained by dispersing a pigment in water, a liquid compound, an insoluble resin, or the like serving as a dispersion medium and pigments having surfaces treated with a resin, a pigment derivative, or the like).

Examples of the organic pigments and the inorganic pigments include yellow pigments, red pigments, magenta pigments, blue pigments, cyan pigments, green pigments, orange pigments, violet pigments, brown pigments, black pigments, and white pigments.

In the case where a pigment is used as the colorant, a pigment dispersing agent may be used as required in preparation of pigment particles.

Regarding the colorants, such as pigments, and the pigment dispersing agents, known publications such as paragraphs 0152 to 0158 of JP2011-225848A and paragraphs 0132 to 0149 of JP2009-209352A can be referred to if necessary.

When the ink of the present disclosure contains a colorant, the content of the colorant can be, for example, 0.05% by mass to 20% by mass and is preferably 0.2% by mass to 10% by mass relative to the total amount of the ink.

It is also preferable to use the ink of the present disclosure as an ink that contains substantially no colorant.

In the present specification, the phrase "contains substantially no colorant" means that the content of the colorant is less than 0.05% by mass relative to the total amount of the ink.

According to an embodiment of the ink that contains substantially no colorant (so-called "clear ink"), it is possible to form a substantially colorless image which has good hardness, adhesion, and scratch resistance.

Other Components

The ink of the present disclosure may contain components other than the components described above.

Examples of the other components include an ultraviolet absorber, a co-sensitizer, an antioxidant, a color-fading inhibitor, and an electroconductive salt.

Regarding the other components, known publications such as JP2011-225848A and JP2009-209352A can be referred to if necessary.

Preferred Physical Properties

The viscosity of the ink of the present disclosure is not particularly limited.

The ink of the present disclosure preferably has a viscosity of 10 mPa·s to 50 mPa·s at 25° C., more preferably has a viscosity of 10 mPa·s to 30 mPa·s at 25° C., and still more preferably has a viscosity of 10 mPa·s to 25 mPa·s at 25° C. The viscosity of the ink can be adjusted by, for example, adjusting the compositional ratio of components contained in the ink.

Herein, the viscosity refers to a value measured by using a viscometer: VISCOMETER RE-85L (manufactured by Toki Sangyo Co., Ltd.).

When the viscosity of the ink is within the above preferred range, ejection stability can be further improved.

The surface tension of the ink of the present disclosure is not particularly limited.

The ink of the present disclosure preferably has a surface tension of 20 mN/m to 30 mN/m at 30° C. and more preferably has a surface tension of 23 mN/m to 28 mN/m at 30° C. When a film is formed on a substrate such as a polyolefin, PET, coated paper, or uncoated paper, the surface tension is preferably 30 mN/m or less from the viewpoint of wettability, and 20 mN/m or more from the viewpoint of permeability and reduction in bleeding.

Herein, the surface tension refers to a value measured by using a surface tensiometer DY-700 (manufactured by Kyowa Interface Science Co., Ltd.).

Method for Forming Image

A method for forming an image of the present disclosure includes an application step of applying an ink of the present disclosure to a substrate, and an irradiation step of irradiating the ink applied to the substrate with active energy rays (that is, "light" in the present specification).

According to the method for forming an image of the present disclosure, an image having good hardness, adhesion, and scratch resistance can be formed.

Application Step

The application step is a step of applying an ink of the present disclosure to a substrate.

Any embodiment using a known method such as a coating method, an immersion method, or an ink jet method may be employed as an embodiment of applying an ink to a substrate. Of these, an embodiment in which the ink of the present disclosure is applied to a substrate by the ink jet method is particularly preferred.

The substrate is not particularly limited, and, for example, known substrates provided as supports and recording media can be appropriately selected and used.

Examples of the substrate include paper, paper laminated with a plastic (such as polyethylene, polypropylene, or polystyrene), metal sheets (such as sheets made of a metal, e.g., aluminum, zinc, or copper), plastic films (such as films made of a polyvinyl chloride (PVC) resin, cellulose diacetate, cellulose triacetate, cellulose propionate, cellulose butyrate, cellulose acetate butyrate, cellulose nitrate, polyethylene terephthalate (PET), polyethylene (PE), polystyrene (PS), polypropylene (PP), polycarbonate (PC), polyvinylacetal, an acrylic resin, or the like), paper laminated with any of the metals, paper on which any of the metals is deposited by vapor deposition, plastic films laminated with any of the metals, and plastic films on which any of the metals is deposited by vapor deposition.

As described above, according to the ink of the present disclosure, an image having good adhesion to a substrate can be formed. Therefore, the ink of the present disclosure is particularly suitable for applications in which an image is formed on a non-absorbable substrate.

Herein, the term "non-absorbable" refers to a property of a water absorption (% by mass, 24 hours) of less than 0.2 as determined in accordance with ASTM D570 of the ASTM test method.

The non-absorbable substrate is preferably a plastic substrate such as a polyvinyl chloride (PVC) substrate, a polystyrene (PS) substrate, a polycarbonate (PC) substrate, a polyethylene terephthalate (PET) substrate, a polypropylene (PP) substrate, or an acrylic resin substrate.

The application of the ink by the ink jet method can be performed by using a known ink jet recording apparatus.

The ink jet recording apparatus is not particularly limited, and a known ink jet recording apparatus capable of achieving a desired resolution can be freely selected and used. Specifically, any known ink jet recording apparatus including a commercially available product can perform the ejection of the ink onto a substrate in the method for forming an image.

An example of the ink jet recording apparatus is an apparatus that includes an ink supply system, a temperature sensor, and heating means.

The ink supply system includes, for example, a source tank including an ink, a supply line, an ink supply tank arranged on the immediate upstream of an ink jet head, a filter, and a piezoelectric ink jet head. The piezoelectric ink jet head can be driven so that multi-size dots of preferably 1 pL to 100 pL and more preferably 8 pL to 30 pL can be ejected at a resolution of preferably 320 dpi (dot per inch)× 320 dpi to 4,000 dpi×4,000 dpi (dot per inch), more preferably 400 dpi×400 dpi to 1,600 dpi×1,600 dpi, and still more preferably 720 dpi×720 dpi to 1,600 dpi×1,600 dpi.

The dpi represents the number of dots per 2.54 cm (1 inch).

Irradiation Step

The irradiation step is a step of irradiating the ink applied to the substrate with active energy rays.

By irradiating the ink applied to the substrate with active energy rays, polymerization reaction of the specific monomer in the ink is caused to proceed. As a result, an image can be fixed, and, for example, the hardness of the image can be improved.

Examples of the active energy rays that can be used in the irradiation step include ultraviolet rays (UV light), visible rays, and electron beams. Of these, UV light is preferred.

The peak wavelength of the active energy rays is preferably 200 nm to 405 nm, more preferably 220 nm to 390 nm, and still more preferably 220 nm to 385 nm.

A peak wavelength in the range of 200 nm to 310 nm is also preferred, and a peak wavelength in the range of 200 nm to 280 nm is also preferred.

An exposure surface illuminance during the irradiation with active energy rays is, for example, 10 mW/cm$^2$ to 2,000 mW/cm$^2$ and preferably 20 mW/cm$^2$ to 1,000 mW/cm$^2$.

Examples of a widely known source for generating the active energy rays include mercury lamps, metal halide lamps, UV fluorescent lamps, gas lasers, and solid-state lasers.

Replacement of the above light source mentioned as examples by semiconductor ultraviolet light-emitting devices is very useful from the industrial and environmental standpoints.

Of the semiconductor ultraviolet light-emitting devices, LEDs (light emitting diodes) and LDs (laser diodes) have small sizes, enhanced lives, high efficiencies, and low costs and are expected to be the light source.

The light source is preferably a metal halide lamp, an extra-high-pressure mercury lamp, a high-pressure mercury lamp, a medium-pressure mercury lamp, a low-pressure mercury lamp, an LED, or a blue-violet laser.

Of these, in the case where a sensitizer and a photopolymerization initiator are used in combination, an extra-high-pressure mercury lamp capable of applying light having a wavelength of 365 nm, 405 nm, or 436 nm, a high-pressure mercury lamp capable of applying light having a wavelength of 365 nm, 405 nm, or 436 nm, or an LED capable of applying light having a wavelength of 355 nm, 365 nm, 385 nm, 395 nm, or 405 nm is more preferred, and an LED capable of applying light having a wavelength of 355 nm, 365 nm, 385 nm, 395 nm, or 405 nm is most preferred.

In the irradiation step, the ink applied to the substrate is irradiated with active energy rays for, for example, 0.01 seconds to 120 seconds and preferably 0.1 seconds to 90 seconds.

Regarding irradiation conditions and a basic irradiation method, the irradiation conditions and the irradiation method disclosed in JP1985-132767A (JP-S60-132767A) can be applied in a similar manner.

Specifically, the method for irradiation with active energy rays is preferably a method in which a light source is disposed on both sides of a head unit including a device for ejecting an ink, and the head unit and the light sources are scanned by a so-called shuttle method or a method in which irradiation with active energy rays is conducted with a separate light source that is not driven.

The irradiation with active energy rays is preferably conducted after a certain period of time (for example, 0.01 seconds to 120 seconds and preferably 0.01 seconds to 60 seconds) after the ink is landed, heated, and dried.

Heating Drying Step

The method for forming an image may further optionally include a heating drying step after the application step and before the irradiation step.

Examples of the heating means include, but are not particularly limited to, a heat drum, hot air, an infrared lamp, a hot oven, and heating with a heating plate.

The heating temperature is preferably 40° C. or higher, more preferably about 40° C. to 150° C., and still more preferably about 40° C. to 80° C.

The heating time can be appropriately determined in consideration of the composition of the ink and the printing speed.

EXAMPLES

The present invention will now be more specifically described with reference to Examples. It is to be understood that the present invention is not limited to the Examples described below within a scope that does not deviate from the gist of the invention.

Synthesis of Specific Resin

Specific Resins P1 to P22 show in Tables 1 and 2 below were synthesized as specific resins.

Hereafter, synthesis examples of some of Specific Resins P1 to P22 will be described. In the description below, compounds for forming respective structural units of the specific resins, such as a compound for forming the unit (1), a compound for forming the unit (2), and a compound for forming the other unit, may be generically referred to as "raw material monomers".

With regard to each of the specific resins, a ratio (% by mole) of each unit relative to all the structural units is also described in Tables 1 and 2. The ratio (% by mole) of each unit relative to all the structural units was determined on the basis of the feed ratio (molar ratio) of the raw material monomers.

Synthesis of Specific Resin P3

Specific Resin P3 was synthesized by allowing a diol compound (specifically, a compound (M1) below) serving as a compound for forming the unit (2) and a diisocyanate compound (specifically, a compound (M101) below) serving as a compound for forming the other unit to react with each other in a molar ratio of compound (M1):compound (M101)=50:50.

Specific Resin P3 has a structure in which the unit (2) of an embodiment in which two $Z^2$ are each a urethane bond (specifically, a unit (2-1)) and a unit including a ring structure and serving as the other unit (specifically, a unit (5-4)) are alternately arranged. That is, in Specific Resin P3, the ratio of the unit (2-1) relative to all the structural units is 50% by mole, and the ratio of the unit (5-4) relative to all the structural units is 50% by mole.

The weight-average molecular weight (Mw) of Specific Resin P3 is 10,000.

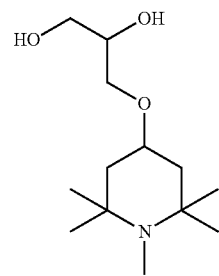

(M1)

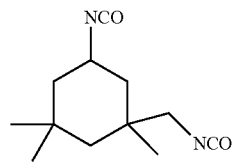

(M101)

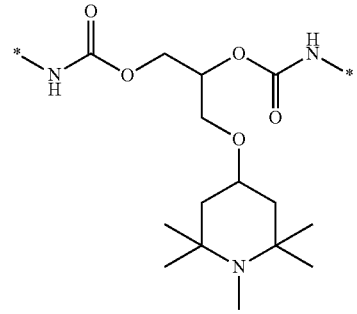

(2-1)

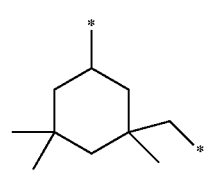

(5-4)

A detailed operation will be described below.

Methyl ethyl ketone (reaction solvent) (248.91 g) was weighed in a 1000-mL three-necked flask equipped with a reflux condenser. The compound (M1) (120.95 g) and the compound (M101) (127.95 g) were added thereto, and the resulting mixture was heated under stirring at 75° C. for 30 minutes in a nitrogen atmosphere. To the mixture, 0.249 g of NEOSTANN U-600 (manufactured by Nitto Kasei Co., Ltd.) was added, and the mixture was further heated under stirring at 75° C. for 10 hours.

The resulting reaction liquid was allowed to cool, and acetone (248.91 g) was added to the reaction liquid. The liquid was then poured into 5,000 mL of water to purify the resulting product by reprecipitation. Subsequently, the product was dried under vacuum at 80° C.

Thus, Specific Resin P3 was produced.

Synthesis of Specific Resin P4

Specific Resin P4 was synthesized by allowing a diol compound (specifically, a compound (M1) below) serving as a compound for forming the unit (2) and a dicarboxylic acid compound (specifically, a compound (M102) below) serving as a compound for forming the other unit to react with each other in a molar ratio of compound (M1):compound (M102)=50:50.

Specific Resin P4 has a structure in which the unit (2) of an embodiment in which two $Z^2$ are each an ester bond (specifically, a unit (2-4)) and a unit including a ring structure and serving as the other unit (specifically, a unit (5-8)) are alternately arranged. That is, in Specific Resin P4, the ratio of the unit (2-4) relative to all the structural units is 50% by mole, and the ratio of the unit (5-8) relative to all the structural units is 50% by mole.

The weight-average molecular weight (Mw) of Specific Resin P4 is 10,000.

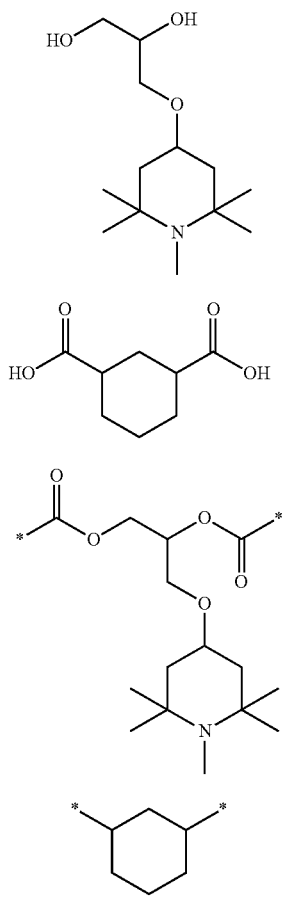

A detailed operation will be described below.

Cyclohexanone (reaction solvent) (215.18 g) was weighed in a 1000-mL three-necked flask equipped with a reflux condenser. The compound (M1) (144.18 g) and the compound (M102) (71 g) were added thereto, and the resulting mixture was heated under stirring at 110° C. for 30 minutes in a nitrogen atmosphere. Monobutyltin oxide (manufactured by Tokyo Chemical Industry Co., Ltd.) (0.43 g) was added to the mixture, and the mixture was further heated under stirring at 110° C. for 24 hours.

The resulting reaction liquid was allowed to cool, and methanol (248.91 g) was added to the reaction liquid. The liquid was then poured into a liquid mixture of 4,500 mL of methanol and 500 mL of water to purify the resulting product by reprecipitation. Subsequently, the product was dried under vacuum at 80° C.

Thus, Specific Resin P4 was produced.

Synthesis of Specific Resin P5

Specific Resin P5 was synthesized by allowing a dicarboxylic acid compound (specifically, a compound (M2) below) serving as a compound for forming the unit (2) and a diamine compound (specifically, a compound (M103) below) serving as a compound for forming the other unit to react with each other in a molar ratio of compound (M2):compound (M103)=50:50.

Specific Resin P5 has a structure in which the unit (2) of an embodiment in which two $Z^2$ are each an amide bond (specifically, a unit (2-18)) and a unit including a ring structure and serving as the other unit (specifically, a unit (5-4)) are alternately arranged. That is, in Specific Resin P5, the ratio of the unit (2-18) relative to all the structural units is 50% by mole, and the ratio of the unit (5-4) relative to all the structural units is 50% by mole.

The weight-average molecular weight (Mw) of Specific Resin P5 is 10,000.

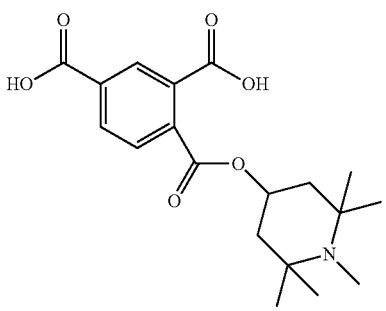

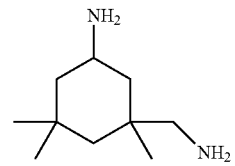

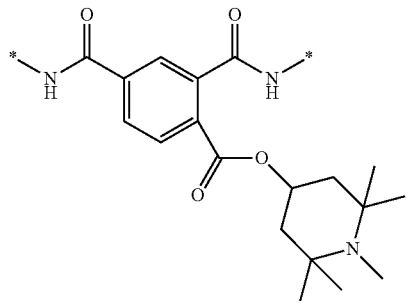

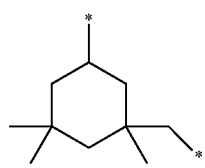

A detailed operation will be described below.

γ-Butyrolactone (reaction solvent) (513.44 g) was weighed in a 1000-mL three-necked flask equipped with a reflux condenser. The compound (M2) (23.43 g) and the compound (M103) (7.12 g) were added thereto, and the resulting mixture was stirred at 25° C. for 30 minutes in a nitrogen atmosphere. Diisopropylcarbodiimide (manufactured by Tokyo Chemical Industry Co., Ltd.) (26.5 g) was added to the mixture, and the mixture was further stirred at 25° C. for five hours. Subsequently, the mixture was further heated to 50° C. and stirred under heating for five hours.

The resulting reaction liquid was allowed to cool. The liquid was poured into a liquid mixture of 2,000 mL of hexane and 2,000 mL of ethyl acetate to purify the resulting product by reprecipitation. Subsequently, the product was dried under vacuum at 80° C.

Thus, Specific Resin P5 was produced.

Synthesis of Specific Resin P6

Specific Resin P6 was synthesized by allowing a diol compound (specifically, a compound (M1) below) serving as a compound for forming the unit (2) and diethyl carbonate to react with each other in a molar ratio of compound (M1):diethyl carbonate=50:50.

Specific Resin P6 has a structure in which a plurality of units (2) of an embodiment where one of two $Z^2$ is a carbonate bond and the other is a single bond (for example, a unit (2-2)) are continuously arranged. That is, in Specific Resin P6, the ratio of the unit (2-2) relative to all the structural units is 100% by mole.

The weight-average molecular weight (Mw) of Specific Resin P6 is 10,000.

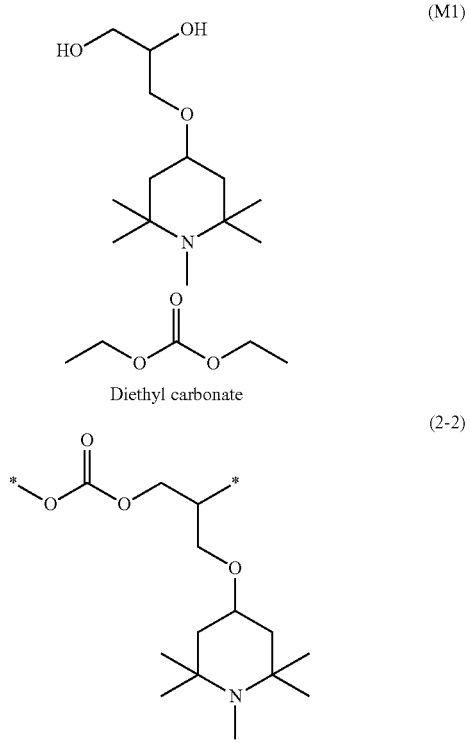

A detailed operation will be described below.

The compound (M1) (115.55 g) and diethyl carbonate (manufactured by Tokyo Chemical Industry Co., Ltd.) (63.5 g) were added to a 300-mL three-necked flask (hereinafter also referred to as a "reaction container") equipped with a reflux condenser and stirred at 110° C. for 30 minutes. A 20 mass % ethanol solution of sodium ethoxide (manufactured by Tokyo Chemical Industry Co., Ltd.) (32.05 g) was added thereto, and the resulting mixture was stirred at 110° C. for two hours in a nitrogen atmosphere. Next, the pressure in the reaction container was reduced to about 30 kPa, and the mixture was further heated to 110° C. and stirred under heating for two hours. Next, the pressure in the reaction container was reduced to about 0.1 kPa, and the mixture was further heated to 110° C. and stirred under heating for one hour.

The resulting reaction liquid was allowed to cool and dissolved in THF (200 g). The liquid was poured into 2,000 mL of water to purify the resulting product by reprecipitation. Subsequently, the resulting product was dried under vacuum at 80° C.

Thus, Specific Resin P6 was produced.

Specific Resins P1, P2, and P7 to P22 were also synthesized as in Specific Resin P3 by appropriately selecting the types and amounts of the raw material monomers (specifically, the compound for forming the unit (1), the compound for forming the unit (2), and the compound for forming the other unit) used.

Specific Resins P19 to P22 were synthesized by changing the weight-average molecular weight (Mw) in the synthesis of Specific Resin P3. The weight-average molecular weight (Mw) was changed by changing the reaction time.

Example 1A

An evaluation of an ink A (monofunctional monomer-based ink) was conducted as Example 1A.

Preparation of Ink A (Monofunctional Monomer-Based Ink)

The ink A was prepared by mixing components having the composition described below.

The composition of the ink A is a composition that includes monofunctional monomers as a base.

Composition of Ink A (Monofunctional Monomer-Based Ink)

IBOA below (Monofunctional monomer): 25.0 parts by mass

CTFA below (Monofunctional monomer): 25.0 parts by mass

PEA below (Monofunctional monomer): 19.9 parts by mass

CN964: 2.0 parts by mass (manufactured by SARTOMER; Urethane oligomer having polymerizable group) IRGACURE 819: 5.0 parts by mass (Photopolymerization initiator manufactured by BASF; Bis(2,4,6-trimethylbenzoyl)-phenylphosphine oxide (Acylphosphine oxide compound)) IRGACURE 184: 3.0 parts by mass (Photopolymerization initiator manufactured by BASF; 1-Hydroxy-cyclohexyl-phenyl-ketone (Carbonyl compound))

ITX (Sensitizer; 2-Isopropylthioxanthone): 1.0 part by mass

BP (Sensitizer; Benzophenone): 2.0 parts by mass

EDB (Sensitizer; Ethyl 4-(dimethylamino) benzoate): 1.0 part by mass

FIRSTCURE ST-1: 0.1 parts by mass (Polymerization inhibitor manufactured by Albemarle Corporation)

BYK-UV3575: 1.0 part by mass (Modified polydimethylsiloxane surfactant manufactured by BYK-Chemie GmbH)

C (cyan) pigment dispersion liquid described below: 12.0 parts by mass

Specific Resin P1: 3.0 parts by mass

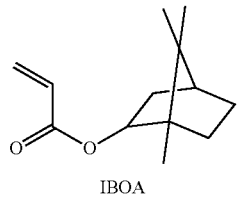

IBOA

-continued

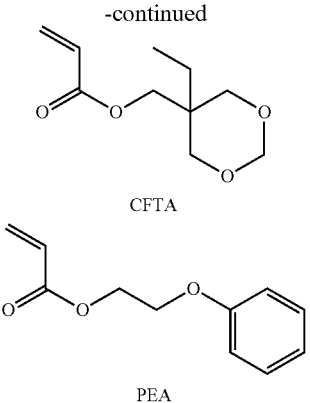

CFTA

PEA

Preparation of C (Cyan) Pigment Dispersion Liquid

The pigment (colorant), the dispersing agent, and the polymerizable monomer described below were mixed and stirred by using a mixer (L4R, manufactured by Silverson) at 2,500 revolutions/min for 10 minutes to prepare a mixture. Subsequently, the resulting mixture was placed in a bead mill disperser DISPERMAT LS (manufactured by VMA GETZMANN GMBH) and dispersed with YTZ balls (manufactured by Nikkato Corporation) having a diameter of 0.65 mm at 2,500 revolutions/min for six hours to prepare a C (cyan) pigment dispersion liquid.

C (Cyan) Pigment Dispersion Liquid

Pigment: C.I. Pigment Blue 15:3 (Cyan pigment, manufactured by Clariant)

20 parts by mass

Dispersing agent: Solsperse 32000 (High-molecular-weight dispersing agent, manufactured by The Lubrizol Corporation) 5 parts by mass Polymerizable monomer: 2-Phenoxyethyl acrylate 75 parts by mass Evaluation of Ink A Evaluations described below were conducted by using the ink A prepared above.

Table 1 shows the results.

Adhesion of Cured Film

Adhesion of an image formed by using the ink A was evaluated by evaluating adhesion of a cured film prepared by curing a coating film of the ink A. The details will be described below.

The evaluation of the adhesion was conducted by using the following sample (PVC) for evaluation and sample (PS) for evaluation.

The sample (PVC) for evaluation was prepares as described below.

First, the ink A prepared above was applied to a polyvinyl chloride (PVC) sheet serving as a substrate by using a No. 2 bar of a K Hand Coater manufactured by RK Print Coat Instruments Ltd. so as to have a thickness of 12 μm. Thus, a coating film was formed. The coating film was cured by being irradiated with UV light (ultraviolet rays) by using a laboratory UV mini conveyor device CSOT (manufactured by GS Yuasa Power Supply Ltd.) including an ozoneless metal halide lamp MAN250L and set at a conveyor speed of 9.0 m/min and an exposure intensity of 2.0 W/cm² to form a cured film. The sample (PVC) for evaluation was prepared as described above.

The sample (PS) for evaluation was prepared as in the preparation of the sample (PVC) for evaluation except that the substrate was changed to a polystyrene (PS) sheet.

Here, the following sheets were used as the PVC sheet and the PS sheet.

PVC sheet: "AVERY (registered trademark) 400 GLOSS WHITE PERMANENT" manufactured by Avery Dennison Corporation PS sheet: "falcon hi impact polystyrene" manufactured by Robert Home Group Limited The cured films of the samples for evaluation were subjected to a cross-hatch test in accordance with ISO2409 (cross-cut method) and evaluated in accordance with the evaluation criteria described below.

In the cross-hatch test, cutting was performed at a spacing of 1 mm to form a grid including 25 squares having a side of 1 mm.

In the evaluation criteria described below, 0 and 1 are in a range that is practically acceptable.

In the evaluation criteria described below, the ratio (%) of squares that have flaked is a value calculated by the following formula. In the following formula, the total number of squares is 25.

Ratio (%) of squares that have flaked=[(number of squares that have flaked)/(total number of squares)]×100

Evaluation Criteria of Adhesion of Cured Film

0: The ratio (%) of squares that had flaked was 0%.

1: The ratio (%) of squares that had flaked was more than 0% and 5% or less.

2: The ratio (%) of squares that had flaked was more than 5% and 15% or less.

3: The ratio (%) of squares that had flaked was more than 15% and 35% or less.

4: The ratio (%) of squares that had flaked was more than 35% and 65% or less.

5: The ratio (%) of squares that had flaked was more than 65%.

Pencil Hardness of Cured Film

Pencil hardness of an image formed by using the ink A was evaluated by evaluating pencil hardness of a cured film prepared by curing a coating film of the ink A. The details will be described below.

The evaluation of the pencil hardness of the cured film was conducted by using the above sample (PVC) for evaluation.

For the cured film of the sample (PVC) for evaluation, a pencil hardness test was conducted by using UNI (registered trademark) manufactured by Mitsubishi Pencil Co., Ltd. as a pencil in accordance with JIS K5600-5-4 (1999).

In the test results, an acceptable range of the pencil hardness is HB or higher and preferably H or higher. Printed matter having a pencil hardness of B or lower is not preferable because a scratch may be formed during handling of the printed matter.

Ejection Stability of Ink A

Ejection stability of the ink A was evaluated by the following method using a commercially available ink jet recording apparatus (manufactured by FUJIFILM Corporation, LuxelJet (registered trademark) UV3600GT/XT: trade name) having a piezoelectric ink ejection head, and a PET (polyethylene terephthalate) film (manufactured by Toray Industries, Inc.) serving as a recording medium (substrate).

The ink A was ejected onto the PET film by using the ink jet recording apparatus under the ejection conditions described below, and the landed ink A was irradiated with UV light (irradiation dose: 1,000 mW/cm²) to form a 100% solid image. This operation was continuously conducted for 60 minutes.

The number of nozzles in which ink clogging occurred during the continuous ejection for 60 minutes (nozzle losses) was determined, and ejection stability was evaluated in accordance with the evaluation criteria described below. In the evaluation criteria described below, A or B is in a range that is practically acceptable.

Ejection Conditions
  Number of channels: 318/head
  Driving frequency: 4.8 kHz/dot
  Ink droplet: 7 droplets, 42 pL
  Temperature of head nozzle: 45° C.

Ejection Stability of Ink A
  A: The number of nozzle losses is 0 or more and less than 2.
  B: The number of nozzle losses is 2 or more and less than 5.
  C: The number of nozzle losses is 5 or more and less than 7.
  D: The number of nozzle losses is 7 or more.

Storage Stability of Ink A

The ink A (50 mL) was placed in a 50-mL glass vial. The glass vial was covered with a lid and left to stand in a thermostatic chamber (60° C.) for four weeks. A viscosity of the ink A was measured before and after standing in the above manner. A rate of increase of the viscosity after standing relative to the viscosity before standing was determined to evaluate storage stability of the ink A in accordance with the evaluation criteria described below. In the evaluation criteria described below, A or B is in a range that is practically acceptable.

The viscosity of the ink A was measured at a liquid temperature of 25° C. by using a VISCOMETER RE-85L (manufactured by Toki Sangyo Co., Ltd.) as a viscometer.

Evaluation Criteria of Storage Stability of Ink A
  A: The rate of increase of the viscosity after standing relative to the viscosity before standing is less than 10%.
  B: The rate of increase of the viscosity after standing relative to the viscosity before standing is 10% or more and less than 20%.
  C: The rate of increase of the viscosity after standing relative to the viscosity before standing is 20% or more and less than 30%.
  D: The rate of increase of the viscosity after standing relative to the viscosity before standing is 30% or more.

Scratch Resistance of Cured Film

Scratch resistance of an image formed by using the ink A was evaluated by conducting the following scratch test using a cured film prepared by curing a coating film of the ink A. The details will be described below.

The evaluation of the scratch resistance of the cured film was conducted by using the above sample (PVC) for evaluation.

The cured film of the sample (PVC) for evaluation was subjected to a scratch test under the conditions described below. After the test, the form of a scratch on the cured film was visually observed to evaluate the scratch resistance of the cured film in accordance with the evaluation criteria described below.

Conditions for Scratch Test
  Test standard: ISO1518 (JIS K 5600)
  Apparatus: Reciprocating Abraser "Model 5900" manufactured by TABER Industries
  Scratching jig: 0.50 mm Scratch Tip for TABER scratch test
  Load: 2 N
  Scratch speed: 35 mm/s
  Number of reciprocating motions of scratching: 5

Evaluation Criteria of Scratch Resistance of Cured Film
  A: No trace remains on the cured film, and scratch resistance of the cured film is very good.
  B: Although a trace remains on the cured film, the cured film is not scraped, and the scratch resistance of the cured film is within an acceptable range in practical application.
  C: The surface of the cured film is scraped, and the scratch resistance of the cured film is out of an acceptable range in practical application.
  D: The surface of the cured film is scraped to expose the surface of the substrate, and the scratch resistance of the cured film is particularly poor.

Examples 2A to 22A

The same operations as those in Example 1A were conducted except that the type of the specific resin was changed as shown in Table 1 below.

Table 1 shows the results.

Examples 23A to 26A

The same operations as those in Example 3A were conducted except that the content of the specific resin relative to the total amount of the ink was changed as shown in Table 1.

The content of the specific resin relative to the total amount of the ink was changed by changing the ratio of the total amount of the three monomers (excluding the monomer included in the pigment dispersion liquid; hereinafter the same) and the amount of the specific resin in the above-described composition of the ink A, while the total amount of the three monomers and the specific resin and the compositional ratio of the three monomers were kept constant.

Table 1 shows the results.

Comparative Examples 1A to 3A

The same operations as those in Example 1A were conducted except that the specific resin was changed to Comparative Resins a to c below.

Table 1 shows the results.

Comparative Resin a is "Tinuvin 622" manufactured by BASF. The structure of Comparative Resin a is shown below. Comparative Resin a has a structure that includes a hindered amine structure and an ester bond in the main chain thereof. The number-average molecular weight of Comparative Resin a is 3,100 to 4,000.

Comparative Resin b is a polymer "A-27" described in paragraph 0104 of JP2011-225848A. The structure of Comparative Resin b is as follows. The number on the lower right side of each unit indicates % by mole. Comparative Resin b is a resin that does not include a hindered amine structure but includes a tertiary amine structure other than the hindered amine structure. The weight-average molecular weight (Mw) of Comparative Resin b is 32,000.

Comparative Resin c is a polymer "A-25" described in paragraph 0103 of JP2011-225848A. The structure of Comparative Resin c is as follows. The number on the lower right side of each unit indicates % by mole. Comparative Resin c is a methacrylic copolymer that includes a hindered amine structure in a side chain thereof. Neither a urethane bond, an ester bond, an amide bond, nor a carbonate bond is present in the main chain of Comparative Resin c. The weight-average molecular weight (Mw) of Comparative Resin c is 15,000.

Comparative Resin a

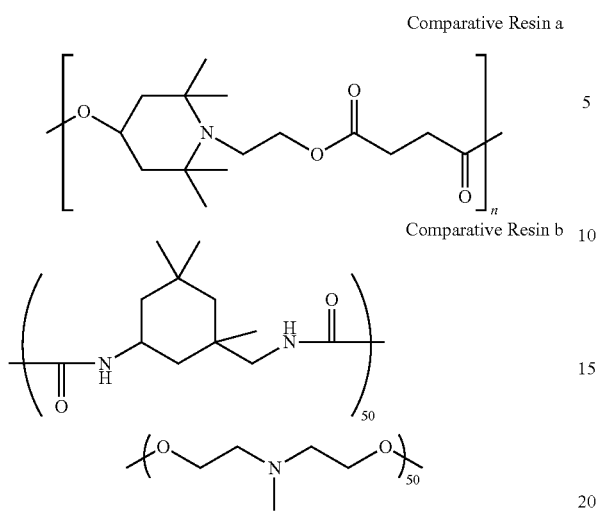

Comparative Resin b

Comparative Resin c

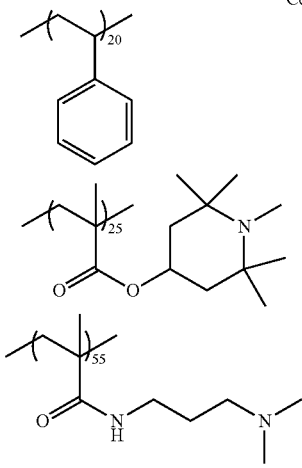

TABLE 1

Evaluation of ink A (Monofunctional monomer-based ink)

| | | Specific Resin or Comparative Resin | | | | | | | | |
|---|---|---|---|---|---|---|---|---|---|---|
| | | Structural unit | | | | | mol % | | | |
| | | (1) or (2) | | Other unit | | | (1) or (2) | Other unit | | |
| | | | | | Including | | | | Including | |
| | Type | Type | Bond ($Z^1$ or $Z^2$) | Including ring | branching X | Including C=C | Others | | Including ring | branching X | Including C=C | Others |
| Example 1A | P1 | (1-1) | Urethane | (5-4) | | | | 50 | 50 | | | |
| Example 2A | P2 | (1-2) | Carbonate | | | | | 100 | | | | |
| Example 3A | P3 | (2-1) | Urethane | (5-4) | | | | 50 | 50 | | | |
| Example 4A | P4 | (2-4) | Ester | (5-8) | | | | 50 | 50 | | | |
| Example 5A | P5 | (2-18) | Amide | (5-4) | | | | 50 | 50 | | | |
| Example 6A | P6 | (2-2) | Carbonate | | | | | 100 | | | | |
| Example 7A | P7 | (2-1) | Urethane | (5-1) | | | | 50 | 50 | | | |
| Example 8A | P8 | (2-1) | Urethane | | | | (3-3) | 50 | | | | 50 |
| Example 9A | P9 | (2-1) | Urethane | (4-13) | | | | 50 | 50 | | | |
| Example 10A | P10 | (2-4) | Ester | | | | (3-3) | 50 | | | | 50 |
| Example 11A | P11 | (2-1) | Urethane | | | | (3-5) | 50 | | | | 50 |
| Example 12A | P12 | (2-1) | Urethane | (5-4) | (7-2) | | | 35 | 50 | 15 | | |
| Example 13A | P13 | (2-1) | Urethane | (5-4) | (7-1) | | | 35 | 50 | 15 | | |
| Example 14A | P14 | (2-1) | Urethane | (5-4) | (7-2) | | | 35 | 50 | 15 | | |
| Example 15A | P15 | (2-1) | Urethane | (5-4) | (7-2) | | | 25 | 50 | 25 | | |
| Example 16A | P16 | (2-1) | Urethane | (5-4) | | (6-1) | | 15 | 50 | | 35 | |
| Example 17A | P17 | (2-4) | Ester | (5-8) | | (6-1) | | 35 | 50 | | 15 | |
| Example 18A | P18 | (2-1) | Urethane | (5-4) | (7-2) | (6-1) | | 25 | 50 | 15 | 10 | |
| Example 19A | P19 | (2-1) | Urethane | (5-4) | | | | 50 | 50 | | | |
| Example 20A | P20 | (2-1) | Urethane | (5-4) | | | | 50 | 50 | | | |
| Example 21A | P21 | (2-1) | Urethane | (5-4) | | | | 50 | 50 | | | |
| Example 22A | P22 | (2-1) | Urethane | (5-4) | | | | 50 | 50 | | | |
| Example 23A | P3 | (2-1) | Urethane | (5-4) | | | | 50 | 50 | | | |
| Example 24A | P3 | (2-1) | Urethane | (5-4) | | | | 50 | 50 | | | |
| Example 25A | P3 | (2-1) | Urethane | (5-4) | | | | 50 | 50 | | | |
| Example 26A | P3 | (2-1) | Urethane | (5-4) | | | | 50 | 50 | | | |
| Com. Ex. 1A | Comparave Resin a (Resin including hindered amine structure and ester bond in main chain; Molecular weight 3100 to 4000) | | | | | | | | | | | |
| Com. Ex. 2A | Comparative Resin b (Resin that does not include hindered amine structure; Mw 32000) | | | | | | | | | | | |
| Com. Ex. 3A | Comparative Resin c (Methacrylic copolymer including hindered amine structure in side chain; Mw 15000) | | | | | | | | | | | |

TABLE 1-continued

| | | Specific Resin or Comparative Resin | | Evaluation results | | | | | |
|---|---|---|---|---|---|---|---|---|---|
| | | | | Content relative to total amount of ink | Pencil | Scratch | Adhesion | | Storage | Ejection |
| | | Amine value (mmol/g) | Mw | (mass %) | hardness | resistance | PVC | PS | stability | stability |
| Example 1A | | 2.36 | 10000 | 3.0 | F | B | 0 | 0 | A | B |
| Example 2A | | 4.11 | 10000 | 3.0 | HB | B | 1 | 1 | A | B |
| Example 3A | | 2.14 | 10000 | 3.0 | H | A | 0 | 0 | A | B |
| Example 4A | | 2.62 | 10000 | 3.0 | H | A | 0 | 0 | A | B |
| Example 5A | | 1.95 | 10000 | 3.0 | H | A | 1 | 1 | A | B |
| Example 6A | | 3.48 | 10000 | 3.0 | H | A | 1 | 1 | A | B |
| Example 7A | | 2.27 | 10000 | 3.0 | H | A | 0 | 0 | A | B |
| Example 8A | | 2.42 | 10000 | 3.0 | F | A | 0 | 0 | A | B |
| Example 9A | | 2.38 | 10000 | 3.0 | H | A | 0 | 0 | A | B |
| Example 10A | | 2.61 | 10000 | 3.0 | F | A | 0 | 0 | A | B |
| Example 11A | | 1.58 | 10000 | 3.0 | H | A | 0 | 0 | A | B |
| Example 12A | | 1.58 | 10000 | 3.0 | H | A | 0 | 0 | A | A |
| Example 13A | | 1.58 | 10000 | 3.0 | H | A | 0 | 0 | A | A |
| Example 14A | | 1.18 | 10000 | 3.0 | H | A | 0 | 0 | A | A |
| Example 15A | | 0.74 | 10000 | 3.0 | F | B | 0 | 0 | A | A |
| Example 16A | | 1.58 | 10000 | 3.0 | 2H | A | 0 | 0 | A | B |
| Example 17A | | 1.92 | 10000 | 3.0 | 2H | A | 0 | 0 | A | B |
| Example 18A | | 1.18 | 10000 | 3.0 | 2H | A | 0 | 0 | A | A |
| Example 19A | | 2.14 | 5000 | 3.0 | H | A | 0 | 0 | A | B |
| Example 20A | | 2.14 | 15000 | 3.0 | H | A | 0 | 0 | A | B |
| Example 21A | | 2.14 | 25000 | 3.0 | H | A | 0 | 0 | A | B |
| Example 22A | | 2.14 | 40000 | 3.0 | H | A | 0 | 0 | B | B |
| Example 23A | | 2.14 | 10000 | 0.5 | F | B | 0 | 0 | A | B |
| Example 24A | | 2.14 | 10000 | 1.5 | H | A | 0 | 0 | A | B |
| Example 25A | | 2.14 | 10000 | 6.0 | H | A | 0 | 0 | A | B |
| Example 26A | | 2.14 | 10000 | 9.0 | H | A | 0 | 0 | B | B |
| Com. Ex. 1A | | Comparative Resin a (Resin including hindered amine structure and ester bond in main chain; Molecular weight 3100 to 4000) | | 3.0 | B | C | 2 | 2 | B | B |
| Com. Ex. 2A | | Comparative Resin b (Resin that does not include hindered amine structure; Mw 32000) | | 3.0 | 2B | D | 5 | 5 | D | D |
| Com. Ex. 3A | | Comparative Resin c (Methacrylic copolymer including hindered amine structure in side chain; Mw 15000) | | 3.0 | 2B | C | 5 | 5 | D | D |

Com. Ex: Comparative Example

As shown in Table 1, according to the inks of Examples 1A to 26A, which contained Specific Resins P1 to P22 each including at least one of the unit (1) or the unit (2), images having good pencil hardness, adhesion, and scratch resistance could be formed. In addition, the inks of Examples 1A to 26A also had good storage stability and ejection stability.

In contrast, in the ink of Comparative Example 1A, which contained the resin (Comparative Resin a) including a hindered amine structure and an ester bond in the main chain thereof, the pencil hardness of the image, the adhesion of the image, and the scratch resistance of the image were inferior to those of the inks of Examples 1A to 26A.

In the ink of Comparative Example 2A, which contained the amine resin (Comparative Resin b) that did not include a hindered amine structure, the pencil hardness of the image, the adhesion of the image, and the scratch resistance of the image were inferior to those of the inks of Examples 1A to 26A.

In the ink of Comparative Example 3A, which contained the methacrylic copolymer (Comparative Resin c) including a hindered amine structure in a side chain thereof but including neither a urethane bond, an ester bond, an amide bond, nor a carbonate bond in the main chain thereof, the pencil hardness of the image, the adhesion of the image, and the scratch resistance of the image were inferior to those of the inks of Examples 1A to 26A.

The results of Examples 1A, 2A, 3A, and 6A show that when a specific resin including the unit (2) is used (Examples 3A and 6A), the pencil hardness and scratch resistance of the image further improve.

The results of Examples 3A to 6A show that when $Z^2$ in the unit (2) is an ester bond or a urethane bond (Examples 3A and 4A), the adhesion of the image further improves.

The results of Examples 7A to 9A show that when the specific resin includes a unit including a ring structure (Examples 7A and 9A), the pencil hardness of the image further improves.

The results of Examples 12A to 15A show that when the specific resin has an amine value of 1.00 mmol/g or more (Examples 12A to 14A), the pencil hardness and scratch resistance of the image further improve.

The results of Examples 19A to 22A show that when the specific resin has a weight-average molecular weight (Mw) of from 5,000 to 30,000, the storage stability of the ink further improves.

The results of Examples 1A to 18A show that when the specific resin includes a branched structure X (that is, "blanching X" in Table 1) (Examples 12A to 15A and 18A), the ejection stability of the ink further improves.

The results of Examples 1A to 18A show that when the specific resin includes an ethylenic double bond (that is, "C=C" in Table 1) (Examples 16A to 18A), the pencil hardness of the image further improves.

The results of Examples 3A and 23A to 26A show that when the content of the specific resin is 1.0% by mass or more relative to the total amount of the ink (Examples 3A and 24A to 26A), the pencil hardness and scratch resistance of the image further improve.

The results of Examples 3A and 23A to 26A show that when the content of the specific resin is 8.0% by mass or less relative to the total amount of the ink (Examples 3A and 23A to 25A), the storage stability of the ink further improves.

Example 1B

The same operations as those in Example 1A were conducted as Example 1B except that the ink A (monofunctional monomer-based ink) was changed to an ink B (bifunctional monomer-based ink) below.

Table 2 shows the results.

Composition of Ink B (Bifunctional Monomer-Based Ink)
  DPGDA below (Bifunctional monomer): 25.0 parts by mass
  HDDA below (Bifunctional monomer): 20.0 parts by mass
  DVE3 below (Bifunctional monomer): 8.9 parts by mass
  VEEA below (Bifunctional monomer): 15.0 parts by mass
  DPHA below (Hexafunctional monomer): 1.0 part by mass
  CN964: 2.0 parts by mass
  (manufactured by SARTOMER; Urethane oligomer having polymerizable group) IRGACURE 819: 5.0 parts by mass
  (Photopolymerization initiator manufactured by BASF; Bis(2,4,6-trimethylbenzoyl)-phenylphosphine oxide (Acylphosphine oxide compound))
  IRGACURE 184: 3.0 parts by mass
  (Photopolymerization initiator manufactured by BASF; 1-Hydroxy-cyclohexyl-phenyl-ketone (Carbonyl compound))
  BP (Sensitizer; Benzophenone): 2.0 parts by mass
  EDB (Sensitizer; Ethyl 4-(dimethylamino) benzoate: 1.0 part by mass
  FIRSTCURE ST-1: 0.1 parts by mass
  (Polymerization inhibitor manufactured by Albemarle Corporation; Tris(N-nitroso-N-phenylhydroxylamine)aluminum salt)
  BYK-UV3575: 1.0 part by mass
  (Modified polydimethylsiloxane surfactant manufactured by BYK-Chemie GmbH)
  C (cyan) pigment dispersion liquid described above: 12.0 parts by mass
  Specific Resin P1: 3.0 parts by mass

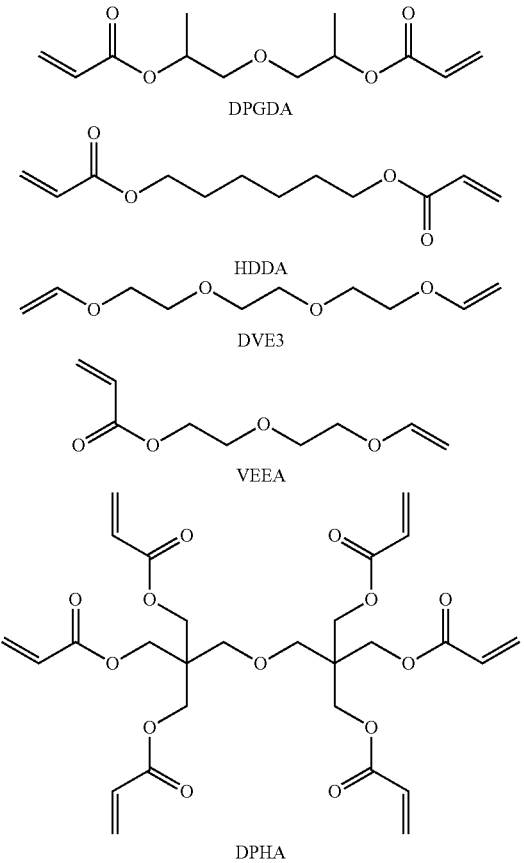

Examples 2B to 22B

The same operations as those in Example 1B were conducted except that the type of the specific resin was changed as shown in Table 2 below.

Table 2 shows the results.

Examples 23B to 26B

The same operations as those in Example 3B were conducted except that the content of the specific resin relative to the total amount of the ink was changed as shown in Table 2.

The content of the specific resin relative to the total amount of the ink was changed by changing the ratio of the total amount of the five monomers and the amount of the specific resin in the above-described composition of the ink B, while the total amount of the five monomers and the specific resin and the compositional ratio of the five monomers were kept constant.

Table 2 shows the results.

Comparative Examples 1B to 3B

The same operations as those in Example 1B were conducted except that the specific resin was changed to Comparative Resins a to c described above.

Table 2 shows the results.

TABLE 2

Evaluation of ink B (Bifunctional monomer-based ink)

Specific Resin or Comparative Resin

| | | | Structural unit | | | | mol % | | | | |
|---|---|---|---|---|---|---|---|---|---|---|---|
| | | | (1) or (2) | Other unit | | | | Other unit | | | |
| | | | | | Including | | | | Including | | |
| | Type | Type | Bond (Z$^1$ or Z$^2$) | Including ring | branching X | Including C=C | Others | (1) or (2) | Including ring | branching X | Including C=C | Others |
| Example 1B | P1 | (1-1) | Urethane | (5-4) | | | | 50 | 50 | | | |
| Example 2B | P2 | (1-2) | Carbonate | | | | | 100 | | | | |
| Example 3B | P3 | (2-1) | Urethane | (5-4) | | | | 50 | 50 | | | |
| Example 4B | P4 | (2-4) | Ester | (5-8) | | | | 50 | 50 | | | |
| Example 5B | P5 | (2-18) | Amide | (5-4) | | | | 50 | 50 | | | |
| Example 6B | P6 | (2-2) | Carbonate | | | | | 100 | | | | |
| Example 7B | P7 | (2-1) | Urethane | (5-1) | | | | 50 | 50 | | | |
| Example 8B | P8 | (2-1) | Urethane | | | | (3-3) | 50 | | | | 50 |
| Example 9B | P9 | (2-1) | Urethane | (4-13) | | | | 50 | 50 | | | |
| Example 10B | P10 | (2-4) | Ester | | | | (3-3) | 50 | | | | 50 |
| Example 11B | P11 | (2-1) | Urethane | | | | (3-5) | 50 | | | | 50 |
| Example 12B | P12 | (2-1) | Urethane | (5-4) | (7-2) | | | 35 | 50 | 15 | | |
| Example 13B | P13 | (2-1) | Urethane | (5-4) | (7-1) | | | 35 | 50 | 15 | | |
| Example 14B | P14 | (2-1) | Urethane | (5-4) | (7-2) | | | 35 | 50 | 15 | | |
| Example 15B | P15 | (2-1) | Urethane | (5-4) | (7-2) | | | 25 | 50 | 25 | | |
| Example 16B | P16 | (2-1) | Urethane | (5-4) | | (6-1) | | 15 | 50 | | 35 | |
| Example 17B | P17 | (2-4) | Ester | (5-8) | | (6-1) | | 35 | 50 | | 15 | |
| Example 18B | P18 | (2-1) | Urethane | (5-4) | (7-2) | (6-1) | | 25 | 50 | 15 | 10 | |
| Example 19B | P19 | (2-1) | Urethane | (5-4) | | | | 50 | 50 | | | |
| Example 20B | P20 | (2-1) | Urethane | (5-4) | | | | 50 | 50 | | | |
| Example 21B | P21 | (2-1) | Urethane | (5-4) | | | | 50 | 50 | | | |
| Example 22B | P22 | (2-1) | Urethane | (5-4) | | | | 50 | 50 | | | |
| Example 23B | P3 | (2-1) | Urethane | (5-4) | | | | 50 | 50 | | | |
| Example 24B | P3 | (2-1) | Urethane | (5-4) | | | | 50 | 50 | | | |
| Example 25B | P3 | (2-1) | Urethane | (5-4) | | | | 50 | 50 | | | |
| Example 26B | P3 | (2-1) | Urethane | (5-4) | | | | 50 | 50 | | | |
| Com. Ex. 1B | Comparative Resin a (Resin including hindered amine structure and ester bond in main chain; Molecular weight 3100 to 4000) | | | | | | | | | | | |
| Com. Ex. 2B | Comparative Resin b (Resin that does not include hindered amine structure; Mw 32000) | | | | | | | | | | | |
| Com. Ex. 3B | Comparative Resin c (Methacrylic copolymer including hindered amine structure in side chain; Mw 15000) | | | | | | | | | | | |

Evaluation of ink B (Bifunctional monomer-based ink)

| | Specific Resin or Comparative Resin | | | Evaluation results | | | | | |
|---|---|---|---|---|---|---|---|---|---|
| | Amine value (mmol/g) | Mw | Content relative to total amount of ink (mass %) | Pencil hardness | Scratch resistance | Adhesion | | Storage stability | Ejection stability |
| | | | | | | PVC | PS | | |
| Example 1B | 2.36 | 10000 | 3.0 | H | B | 0 | 0 | A | B |
| Example 2B | 4.11 | 10000 | 3.0 | F | B | 1 | 1 | A | B |
| Example 3B | 2.14 | 10000 | 3.0 | 2H | A | 0 | 0 | A | B |
| Example 4B | 2.62 | 10000 | 3.0 | 2H | A | 0 | 0 | A | B |
| Example 5B | 1.95 | 10000 | 3.0 | 2H | A | 1 | 1 | A | B |
| Example 6B | 3.48 | 10000 | 3.0 | 2H | A | 1 | 1 | A | B |
| Example 7B | 2.27 | 10000 | 3.0 | 2H | A | 0 | 0 | A | B |
| Example 8B | 2.42 | 10000 | 3.0 | H | A | 0 | 0 | A | B |
| Example 9B | 2.38 | 10000 | 3.0 | 2H | A | 0 | 0 | A | B |
| Example 10B | 2.61 | 10000 | 3.0 | H | A | 0 | 0 | A | B |
| Example 11B | 1.58 | 10000 | 3.0 | 2H | A | 0 | 0 | A | B |
| Example 12B | 1.58 | 10000 | 3.0 | 2H | A | 0 | 0 | A | A |
| Example 13B | 1.58 | 10000 | 3.0 | 2H | A | 0 | 0 | A | A |
| Example 14B | 1.18 | 10000 | 3.0 | 2H | A | 0 | 0 | A | A |
| Example 15B | 0.74 | 10000 | 3.0 | H | B | 0 | 0 | A | A |
| Example 16B | 1.58 | 10000 | 3.0 | 3H | A | 0 | 0 | A | B |
| Example 17B | 1.92 | 10000 | 3.0 | 3H | A | 0 | 0 | A | B |
| Example 18B | 1.18 | 10000 | 3.0 | 3H | A | 0 | 0 | A | A |
| Example 19B | 2.14 | 5000 | 3.0 | 2H | A | 0 | 0 | A | B |
| Example 20B | 2.14 | 15000 | 3.0 | 2H | A | 0 | 0 | A | B |
| Example 21B | 2.14 | 25000 | 3.0 | 2H | A | 0 | 0 | A | B |

| | | | | | | | | | |
|---|---|---|---|---|---|---|---|---|---|
| Example 22B | 2.14 | 40000 | 3.0 | 2H | A | 0 | 0 | B | B |
| Example 23B | 2.14 | 10000 | 0.5 | H | B | 0 | 0 | A | B |
| Example 24B | 2.14 | 10000 | 1.5 | 2H | A | 0 | 0 | A | B |
| Example 25B | 2.14 | 10000 | 6.0 | 2H | A | 0 | 0 | A | B |
| Example 26B | 2.14 | 10000 | 9.0 | 2H | A | 0 | 0 | B | B |
| Com. Ex. 1B | Comparative Resin a (Resin including hindered amine structure and ester bond in main chain; Molecular weight 3100 to 4000) | | 3.0 | HB | C | 2 | 2 | B | B |
| Com. Ex. 2B | Comparative Resin b (Resin that does not include hindered amine structure; Mw 32000) | | 3.0 | B | D | 5 | 5 | D | D |
| Com. Ex. 3B | Comparative Resin c (Methacrylic copolymer including hindered amine structure in side chain; Mw 15000) | | 3.0 | B | C | 5 | 5 | D | D |

Com. Ex: Comparative Example

As shown in Table 2, in the evaluations of the ink B (bifunctional monomer-based ink), tendencies similar to those in the evaluations (Table 1) of the ink A (monofunctional monomer-based ink) described above were observed.

Furthermore, the results showed that, in the ink B (bifunctional monomer-based ink), the pencil hardness of the image was improved compared with that in the evaluation (Table 1) of the ink A (monofunctional monomer-based ink).

The entire contents of the disclosure of Japanese Patent Application No. 2017-068888 filed on Mar. 30, 2017 are incorporated in the present specification by reference.

All documents, patent applications, and technical standards described herein are incorporated by reference in the present specification to the same degree as when individual documents, patent applications, and technical standards are incorporated by reference specifically and individually.

What is claimed is:

1. A photocurable ink composition comprising:
   a resin that includes at least one of a structural unit (1) below or a structural unit (2) below; and
   at least one of a monofunctional radical-polymerizable monomer or a bifunctional radical-polymerizable monomer,
   wherein a total content of the monofunctional radical-polymerizable monomer and the bifunctional radical-polymerizable monomer is 50% by mass or more relative to a total amount of the photocurable ink composition:

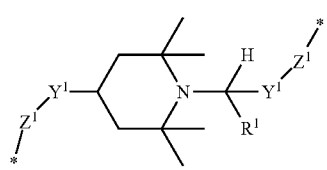

(1)

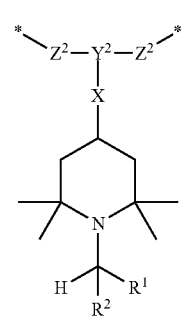

(2)

wherein, in the structural unit (1),
$R^1$ represents a hydrogen atom or an alkyl group having 1 to 3 carbon atoms,
two $Y^1$ each independently represent a single bond or a divalent organic group having 1 to 20 carbon atoms,
two $Z^1$ each independently represent a single bond, a carbonate bond, an amide bond, or a urethane bond,
two * each represent a binding site, and
provided that, in a case where one of two $Z^1$ is a single bond, the other is not a single bond, and
wherein, in the structural unit (2),
$R^1$ represents a hydrogen atom or an alkyl group having 1 to 3 carbon atoms,
$R^2$ represents a hydrogen atom or a hydrocarbon group having 1 to 12 carbon atoms,
X represents an ether bond or an ester bond,
$Y^2$ represents a trivalent organic group having 1 to 20 carbon atoms,
two $Z^2$ each independently represent a single bond, an ester bond, a carbonate bond, an amide bond, or a urethane bond,
two * each represent a binding site, and
provided that, in a case where one of two $Z^2$ is a single bond, the other is not a single bond.

2. The photocurable ink composition according to claim 1, wherein the resin includes the structural unit (2).

3. The photocurable ink composition according to claim 2, wherein two $Z^2$ in the structural unit (2) each independently represent an ester bond or a urethane bond.

4. The photocurable ink composition according to claim 1, wherein the resin further includes a structural unit that has a ring structure.

5. The photocurable ink composition according to claim 1, wherein the resin has an amine value of 1.00 mmol/g or more.

6. The photocurable ink composition according to claim 1, wherein the resin has a weight-average molecular weight of from 5,000 to 30,000.

7. The photocurable ink composition according to claim 1, wherein a ratio of a total amount of the structural unit (1) and the structural unit (2) with respect to a total amount of all the structural units of the resin is 10% by mole or more.

8. The photocurable ink composition according to claim 1,
wherein the resin includes a branched structure X,
the branched structure X is an alkylene group having 2 or more carbon atoms and substituted with a substituent, and
the substituent is at least one selected from the group consisting of a linear alkyl group having 2 or more carbon atoms, a branched alkyl group having 3 or more carbon atoms, a linear alkoxy group having 2 or more carbon atoms, a branched alkoxy group having 3 or more carbon atoms, a linear alkoxyalkyl group having 2 or more carbon atoms, and a branched alkoxyalkyl group having 3 or more carbon atoms.

9. The photocurable ink composition according to claim 8, wherein the resin further includes a structural unit that has the branched structure X, as a structural unit other than the structural unit (1) and the structural unit (2).

10. The photocurable ink composition according to claim 1, wherein the resin includes an ethylenically unsaturated bond.

11. The photocurable ink composition according to claim 10, wherein the resin further includes a structural unit that has the ethylenically unsaturated bond, as a structural unit other than the structural unit (1) and the structural unit (2).

12. The photocurable ink composition according to claim 1, wherein a content of the resin is from 1.0% by mass to 8.0% by mass relative to the total amount of the photocurable ink composition.

13. The photocurable ink composition according to claim 1, further comprising a photopolymerization initiator.

14. A method for forming an image, comprising:
applying the photocurable ink composition according to claim 1 to a substrate; and
irradiating the photocurable ink composition applied to the substrate with active energy rays.

* * * * *